United States Patent
Cheon et al.

(10) Patent No.: US 8,019,558 B2
(45) Date of Patent: Sep. 13, 2011

(54) METHOD FOR PREDICTING FAILURE OF GEOTECHNICAL STRUCTURES

(75) Inventors: Dae-Sung Cheon, Daejeon (KR); Eui-Sub Park, Daejeon (KR); Yong-Bok Jung, Daejeon (KR); Chan Park, Daejeon (KR); Joong-Ho Synn, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 30 days.

(21) Appl. No.: 12/666,556

(22) PCT Filed: May 8, 2009

(86) PCT No.: PCT/KR2009/002446
§ 371 (c)(1),
(2), (4) Date: Dec. 23, 2009

(87) PCT Pub. No.: WO2009/136768
PCT Pub. Date: Nov. 12, 2009

(65) Prior Publication Data
US 2010/0206078 A1    Aug. 19, 2010

(30) Foreign Application Priority Data

May 9, 2008    (KR) .................. 10-2008-0043454

(51) Int. Cl.
*G01B 5/28* (2006.01)
(52) U.S. Cl. .................................................. 702/35
(58) Field of Classification Search .......... 702/35, 702/38, 39, 42, 48, 54, 56, 59, 75, 103, 171, 702/177, 183, 185, 188, 189
See application file for complete search history.

(56) References Cited

U.S. PATENT DOCUMENTS

2006/0285438 A1    12/2006    Arrowsmith et al.
2008/0278319 A1*   11/2008    Meiksin et al. ............... 340/540

FOREIGN PATENT DOCUMENTS

JP    9-138223 A    5/1997

OTHER PUBLICATIONS

Dae-Sung Cheon et al., "Monitoring Technique using Acoustic Emission and Microseismic Event", Journal of Korean Society for Rock Mechanics: Tunnel & Underground Space, Feb. 2008, pp. 1-9, vol. 18, No. 1.
Soo-Ho Chang, Chung-In Lee, "Measurement of Rock Fracture Toughness Under Mode I, II & Mixed-Mode Conditions by Using Disc-Typed Specimens", Journal of Korean Society for Rock Mechanics: Tunnel & Underground Space, 1999, pp. 315-327, vol. 9.
Hyun-Jin Shim, Chung-In Lee, "A Study on the Measurement of Acoustic Emission and Deformation Behaviors of Rock and Concrete under Compression", Journal of Korean Society for Rock Mechanics: Tunnel & Underground Space, 2000, pp. 59-69, vol. 10.

* cited by examiner

*Primary Examiner* — Mohamed Charioui
(74) *Attorney, Agent, or Firm* — The Webb Law Firm

(57) ABSTRACT

Provided is a method of predicting failure in geotechnical structures using an AE method instead of a conventional displacement or stress measuring method, which belongs to a field of rock mechanics and geotechnical engineering. The method is a measurement technology for identifying signs of failure in geotechnical structures using Acoustic Emission (AE) signals generated by damage in the geotechnical structure and also providing management standard for failure prediction.

3 Claims, 16 Drawing Sheets

METHOD FOR PREDICTING FAILURE OF GEOTECHNICAL STRUCTURES

CROSS-REFERENCE(S) TO RELATED APPLICATIONS

The present invention claims priority of Korean Patent Application No. 10-2008-0043454, filed on May 9, 2008, which is incorporated herein by reference.

BACKGROUND OF THE INVENTION

1. Field of the Invention

The present invention relates to the field of rock mechanics and geotechnical engineering; and, particularly, to a measurement technology for identifying signs of failure of geotechnical structures using Acoustic Emission (AE) signals generated by a damage in the geotechnical structures and also providing a management standard for failure prediction; and, more particularly, to a method of predicting failure of geotechnical structures using the AE method instead of a conventional displacement or stress measuring method.

2. Description of Related Art

The present invention relates to a measurement technology for identifying signs of failure of geotechnical structures using Acoustic Emission (AE) signals generated by a damage in the geotechnical structures and also providing a management standard for failure prediction, which belongs to the field of rock mechanics and geotechnical engineering. In detail, the present invention relates to a method of predicting failure in geotechnical structures using the AE method instead of a conventional displacement or stress measuring method. Herein, the AE signal is an idea including AE and microseismic (MS) events.

AE is an elastic wave generated when energy of sudden strain relevant to damage of a material is emitted. Generally, generation of the AE signal is sharply increased before macro-failure. As general technologies and equipments for predicting failure in geotechnical structures, today, there are a displacement measuring method using a rod extensometer, an inclinometer probe or GPS; a method of measuring a change in underground water level using a piezometer; and a stress measuring method using a load-meter. Since the strain before failure in geotechnical structures is very small, it is difficult to identify the signs of failure using the conventional displacement or stress measuring method. However, before the failure in the geotechnical structures, microcracks are generated along affixed with minute strain and then the microcracks are grown and coalesced each other, whereby the failure occurs finally. Therefore, if it is possible to detect the microcracks, it is possible to identify the signs of failure. In other words, before the final failure, the microcracks are generated in the geotechnical structures, and the microcracks cannot be detected by the displacement or stress but can be detected by the AE signals.

However, in a measurement apparatus affixed with an AE sensor for predicting failure in geotechnical structures using AE signals, since attenuation of the AE signals is occurred necessarily, it is difficult to obtain generalized parameters for predicting the failure in the geotechnical structures from the AE signals detected by the AE sensors that are respectively positioned at a difference place.

Further, since the ground constituting the geotechnical structures is comprised of rocks and soils and thus the AE signals generated at each area of the ground are not the same as each other, it is difficult to obtain the generalized parameters for predicting the failure in the geotechnical structures.

SUMMARY OF THE INVENTION

An embodiment of the present invention is directed to providing a generalized method of predicting failure in geotechnical structures, which introduces new parameters reflecting an effect of attenuation due to wave waveguide and thus can predict the failure in the geotechnical structures regardless of an attenuation level of AE signal.

Another embodiment of the present invention is directed to providing a method of predicting failure in geotechnical structures, which uses a measurement apparatus affixed with AE sensors that detect the same AE signal as each other regardless of ground conditions and formations in the geotechnical structures when the geotechnical structures are damaged and thus can precisely predict failure and damage in the geotechnical structures.

Another embodiment of the present invention is directed to providing a method of predicting failure in geotechnical structures, which employs a measurement apparatus affixed with AE sensors that can reduce attenuation of AE signal and thus detect a wide range of AE signals.

To achieve the object of the present invention, the present invention provides a method of predicting failure in geotechnical structures, including: measuring specific AE signals generated from damages to an outer waveguide by the deformation or movement in geotechnical structures using a measurement apparatus affixed with AE sensors, wherein the measurement apparatus affixed with AE sensors, at least one of which is attached to the inner waveguide, is fixedly installed in a borehole and passes through an expected failure plane and includes both an inner waveguide, which is formed of metallic material that is intended to prevent sharp attenuations of AE signals, and an outer waveguide, which firmly encloses at least one AE sensor as well as the inner waveguide and is formed of a homogeneous brittle material that is intended to generate specific AE signals regardless of ground conditions or formations when the outer waveguide is damaged by the events that indicated there are deformations or movements in the geotechnical structures; obtaining parametric values in the geotechnical structures, which indicate damage levels in the geotechnical structures, in order to predict the failure in the geotechnical structures, wherein these parametric values are extracted from the AE signals measured by at least one AE; performing at least one of laboratory tensile, shear and compression tests with respect to an laboratory testing measurement apparatus affixed with AE sensors that is the same as the installed measurement apparatus in field (or the geotechnical structures), and obtaining AE signals generated by the damage of an outer waveguide of the laboratory testing measurement apparatus affixed with AE sensors. obtaining laboratory parametric values with applied load in the laboratory tests, which correspond to the parametric values in the geotechnical structures, are extracted from AE signals generated by the damage of the outer waveguide of the laboratory testing measurement; and comparing one or more reference parametric values and obtained parametric values in geotechnical structures, wherein the one or more reference parametric values indicate the damage levels in geotechnical structures, are included in laboratory parametric values corresponding to the parametric values in the geotechnical structures, and the obtained parametric values in geotechnical sturctures are obtained in the parametric values-obtaining step in geotechnical structures, and evaluating where the geotechnical structures correspond the damage levels from one or more reference parametric values.

Preferably, the parameter obtained in the obtaining of the parametric values in the geotechnical structures includes a count value, an amplitude value, a duration value, a rise time value, an AE energy value and the like of the measured AE signals, and each parameter may be defined as follows:

(1) the 'count' is the number of times when the AE signal exceeds a threshold. In general, since a large striking sound has more time when the AE signal exceeds the threshold, comparing affixed with a small striking sound, the 'count' may be used as a reference for estimating intensity of the AE signal.

(2) the 'amplitude' is a maximum amplitude in the AE signal. Typically, it is relevant to a strength of sound source in a material generating an AE sound, and it is expressed by a unit of log (decibels, dB) and thus it is possible to precisely measure both of a large signal and a small signal. Analysis of the amplitude should be carried out using a sensor having the same amplifying level and the same type due to many factors that have an influence on the amplitude.

(3) the 'duration' is a period of time when the AE signal passes from an initial detection limit to a final detection limit, and it is used in filtering and the like.

(4) the 'rise time' is a period of time when the AE signal passes the detection limit and then arrives at the maximum amplitude. Since it is controlled by a wave propagation process between the sound source and the sensor, it is typically used in separating the AE signal from electromagnetic noise.

(5) the 'energy' is a measured value corresponding to a surface area of the envelope in the waveform of the AE signal during the duration. Since it is sensitive to the duration and the amplitude but less dependent on the detection limit setting value or frequency, it is more used than the 'count'.

Preferably, the obtained parametric value obtained in the geotechnical structures may include an accumulated value and a frequency value affixed with respect to a count value, an energy value, an amplitude value, a duration value, a rise time value and the like of the measured AE signal. Among them, for example, the accumulated value and the frequency value affixed with respect to the count value and the energy value as representative parametric values will be described.

In other words, the obtained parametric value in the geotechnical structures is at least one of a count value, accumulated count value and a count frequency value of the measured AE signal, wherein the count is a parameter which is indicated by the number of times, of which amplitudes exceed a threshold in an AE signal waveform obtained from the AE signal during a desired time interval $\Delta t_1$, which are generated from the damages to the outer waveguide by specific events, the accumulated count is a parameter which is an accumulative sum of the count values with respect to the different specific events according to the lapse of time, and the count frequency is a parameter which is a total of the count values obtained during a desired time interval $\Delta t_2$ with respect to the different specific events according to the lapse of time; and assuming that k is a natural number equal to or larger than 2, $\Delta t_2$ is $\Delta t_2 = k\Delta t_1$.

Preferably, the obtained parametric values in the geotechnical structures are at least one of an energy value, an accumulated energy value and a energy frequency value of the measured AE signal, wherein the energy is a parameter which is indicated by a surface area of an envelope of a AE signal waveform or a maximum amplitude in the AE signal waveform. The AE signal waveform is obtained from the AE signal during a desired time interval $\Delta t_1$, which are generated from the damages to the outer waveguide by specific events; the accumulated energy is a parameter which is an accumulative sum of the energy values with respect to the different specific events according to the lapse of time; the energy frequency is a parameter which is a total of the energy values obtained during a desired time interval $\Delta t_2$ with respect to the different specific events according to the lapse of time; and assuming that k is a natural number equal to or larger than 2, $\Delta t_2$ is $\Delta t_2 = k\Delta t_1$.

Preferably, coefficients of reference parameters corresponding to the damage levels in the geotechnical structures are $C_1$, $C_2$ and $C_3$, and the reference coefficient $C_1$ is a value for determining where the damage level in the geotechnical structure corresponds to a 'dangerous level' in which the damage in the geotechnical structures may be developed to a macro-failure in the geotechnical structures and also a value when load corresponding to 80% of failure strength is applied to the laboratory testing measurement apparatus affixed with AE sensors used in the laboratory tests, and the reference coefficient $C_2$ is a value for evaluating where the damage level in the geotechnical structures corresponds to a 'damage developing level' in which the damage in the geotechnical structures sharply grows and thus can proceed to the 'dangerous level', and also a value when load corresponding to 60% of failure strength is applied to the laboratory measurement apparatus affixed with AE sensors used in the laboratory tests, and the reference coefficient $C_3$ is a value for determining whether the damage level in the geotechnical structures passes a 'safe level' in which the geotechnical structures are insignificantly damaged or not damaged, and then their damage level arrives at a 'damage proceeding level' in which the geotechnical structures are slowly damaged and thus can proceed to the 'damage developing level', and also a value when load corresponding to 40% of failure strength is applied to the laboratory measurement apparatus affixed with AE sensors used in the laboratory tests.

Further, the present invention provides a method of predicting failure in geotechnical structures, including: measuring specific AE signals generated from damages to an outer waveguide by a deformation or movement info the geotechnical structures using a measurement apparatus affixed with AE sensors, wherein the measurement apparatus affixed with AE sensors is fixedly installed in a borehole and passes through an expected failure plane and includes both an inner waveguide, which is formed of metallic material that is intended to prevent sharp attenuations of AE signals, and an outer waveguide; two AE sensors are attached to the inner waveguide so that the expected failure plane is interposed between two AE sensors, and one of which above the other; the outer waveguide firmly encloses at least one AE sensor as well as the inner waveguide; and the outer waveguide is formed of a homogeneous brittle material that is intended to generate specific AE signals regardless of ground conditions or formations when the outer waveguide is damaged by the events that indicated there are deformations or movements in the geotechnical structures; obtaining arrival times from an AE signal generated from the damages to the outer waveguide by a specific event, wherein the AE signal is measured by the upper AE sensor and the lower AE sensor and the arrival time is defined as time when an initial AE signal waveform arriveds at each of the upper and lower AE sensors; determining a distance between the upper AE sensor and a source of the AE signal or a distance between the lower AE sensor and the source of the AE signal from a difference between the arrival times obtained from the AE signal measured by the upper AE sensor and the lower AE sensor; obtaining at least one parametric values of a summed value, an accumulated summed value and summed magnitude frequency value of the AE signals measured by the upper or lower AE sensor, in order to predict the failure in the geotechnical structures from the AE signals measured by the upper or lower AE sensor; performing at least one of laboratory tensile, shear and compression tests with respect to an laboratory testing measurement apparatus affixed with AE sensors that is the same as the installed measurement apparatus in field, and obtaining AE signals generated by the damage of an outer waveguide of the laboratory testing measurement apparatus affixed with AE sensors, wherein obtaining laboratory parametric values with applied load in the laboratory tests, which correspond to the parametric values in the geotechnical structures, are extracted from AE signals generated by the damage of the outer waveguide of the laboratory testing measurement apparatus; and comparing one or more reference parametric values and obtained parametric values in geotechnical structures, wherein the one or more reference parametric values indicate the damage levels in geotechnical structures, are among laboratory parametric values corresponding to the parametric values in the geotechnical structures and the obtained parametric values in geotechnical sturctures are obtained in the parametric values-obtaining step in geotechnical structures, and wherein the summed magnitude is a parameter which is indicated by $G(d)\Theta F(E)$ of the AE signals and the AE signals are measured during a desired time interval $\Delta t1$, and generated from the damage to an outer waveguide by the specific events, and the accumulated summed magnitude is a parameter which is an accumulative sum of the summed values with respect to the different specific events according to the lapse of time, and the summed magnitude frequency is a parameter which is a total of the summed magnitude values obtained during a desired time interval $\Delta t2$ with respect to the different specific events according to the lapse of time, and assuming that k is a natural number equal to or larger than 2, $\Delta t2$ is $\Delta t2 = k\Delta t1$, and d is a distance between one of the upper and lower AE sensors and the source of the AE signal, which is used in obtaining the summed magnitude value in the determining of distance from specific source and $G(d)$ is an attenuating function according to d, and is indicated by $G(d) = A_1 d + A_2$ or $G(d) = B_1 e^{-d} + B_2$, and $A_1, A_2, B_1$ and $B_2$ are regression coefficients which are decided by a material of the inner guide, and $\Theta$ is an operator decided by $G(d)$, and $F(E)$ is an energy function of the AE signal used in obtaining of the summed value.

Preferably, the $F(E)$ is one of $$\log\left(\frac{ppA}{2\pi f}\right), \log\left(\sqrt{\frac{\sum_{j=1}^{n} A_j^2}{n}}\right)$$

and $dB_{peak}$, wherein ppA is a maximum particle acceleration of the AE signal used in obtaining the summed value, f is a dominant frequency of the AE signal used in obtaining the summed value, n is a count of the AE signal used in obtaining the summed value, $A_j$ is an amplitude of a j-th waveform forming the AE signal used in obtaining the summed value, which is over a threshold value, and $dB_{peak}$ is a maximum amplitude in the waveform forming the AE signal used in obtaining the summed value.

Preferably, coefficients of reference parameters corresponding to the damage levels in the geotechnical structures are $C_1, C_2$ and $C_3$, and, the reference coefficient $C_1$ is a value for evaluating where the damage level in the geotechnical structures corresponds to a 'dangerous level' in which a macro-failure in the geotechnical structures may be occurred, and also a value when force corresponding to 80% of failure strength is exerted to the laboratory testing measurement apparatus affixed with AE sensors used in the laboratory test, the reference coefficient $C_2$ is a value for evaluating where the damage level in the geotechnical structures corresponds to a 'damage developing level' in which the geotechnical structures are sharply damaged and thus can proceed to the 'dangerous level', and also a value when force corresponding to 60% of failure strength is exerted to the laboratory measurement apparatus affixed with AE sensors used in the laboratory test, and the reference coefficient $C_3$ is a value for evaluating whether the damage level in the geotechnical structures passes a 'safe level' in which the geotechnical structures are insignificantly damaged or not damaged, and then arrive at a 'damage proceeding level' in which the geotechnical structures are slowly damaged and thus can proceed to the 'damage developing level', and also a value when force corresponding to 40% of failure strength is exerted to the laboratory measurement apparatus affixed with AE sensors used in the laboratory test.

BRIEF DESCRIPTION OF THE DRAWINGS

wag

DETAILED DESCRIPTION OF MAIN ELEMENTS

Figure 1:
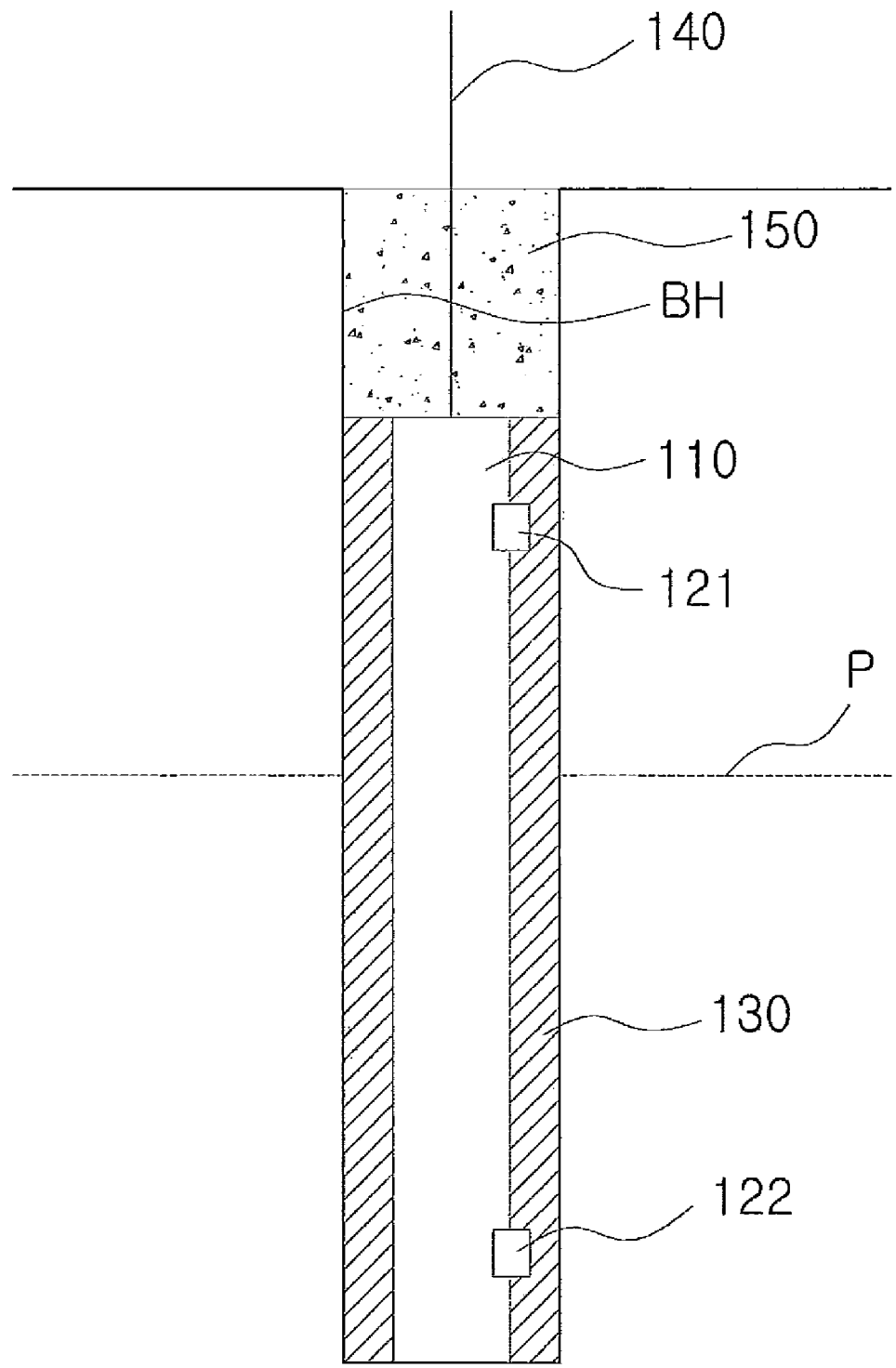
FIG. 1 is a schematic view showing an installed state of a measurement apparatus affixed with AE sensors used in a first embodiment of the present invention.

110: inner waveguide
121, 1121: upper AE sensor 122, 1122: lower AE sensor
130, 1130: outer waveguide 140: string
150: attenuating material 210: AE/MS controller
212: signal conditioner 214: DAQ board
216: monitoring computer
220: external power supply unit
230: transmitter module 240: receiver module
250: data server

DESCRIPTION OF SPECIFIC EMBODIMENTS

The advantages, features and aspects of the invention will become apparent from the following description of the embodiments affixed with reference to the accompanying drawings, which is set forth hereinafter.

First Embodiment

Figure 2:
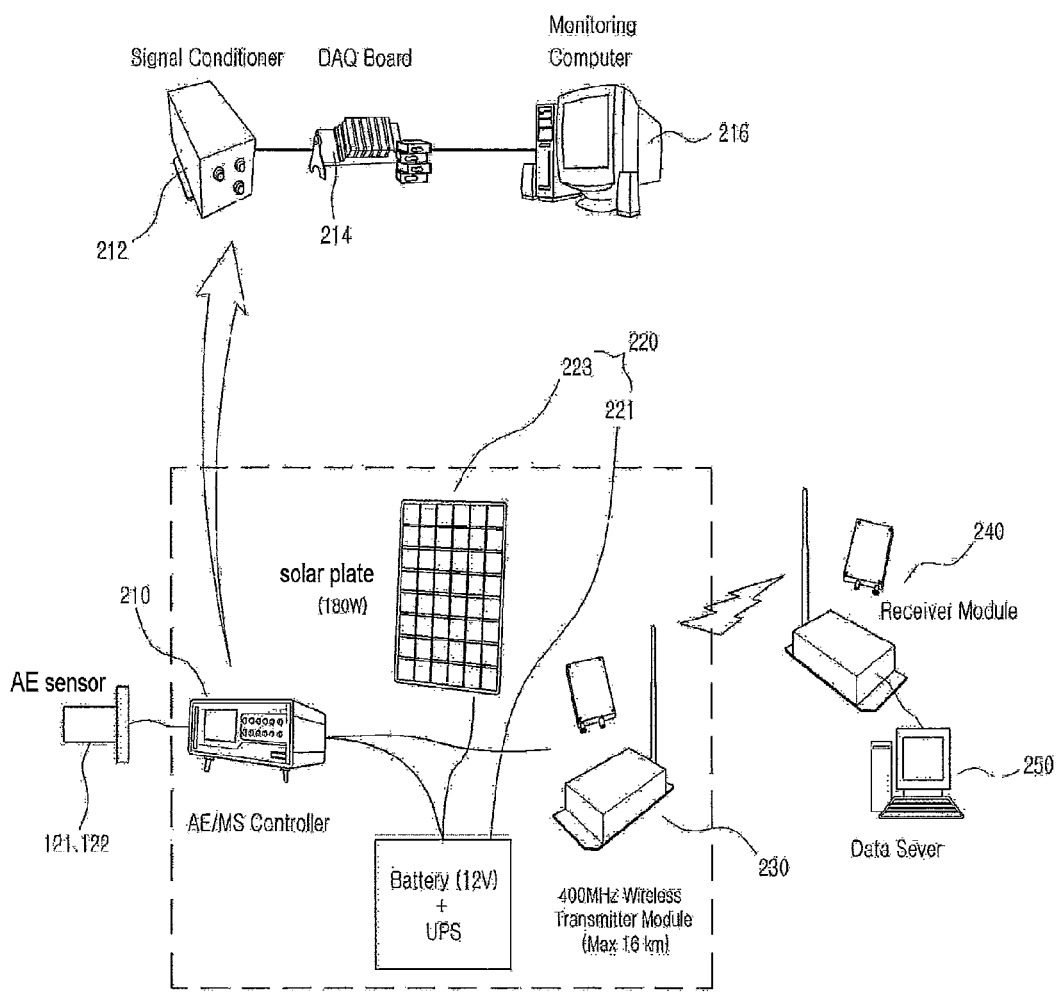
FIG. 2 is a schematic view showing a construction of a measurement apparatus set affixed with AE sensors used in a first embodiment of the present invention.
Figure 3:
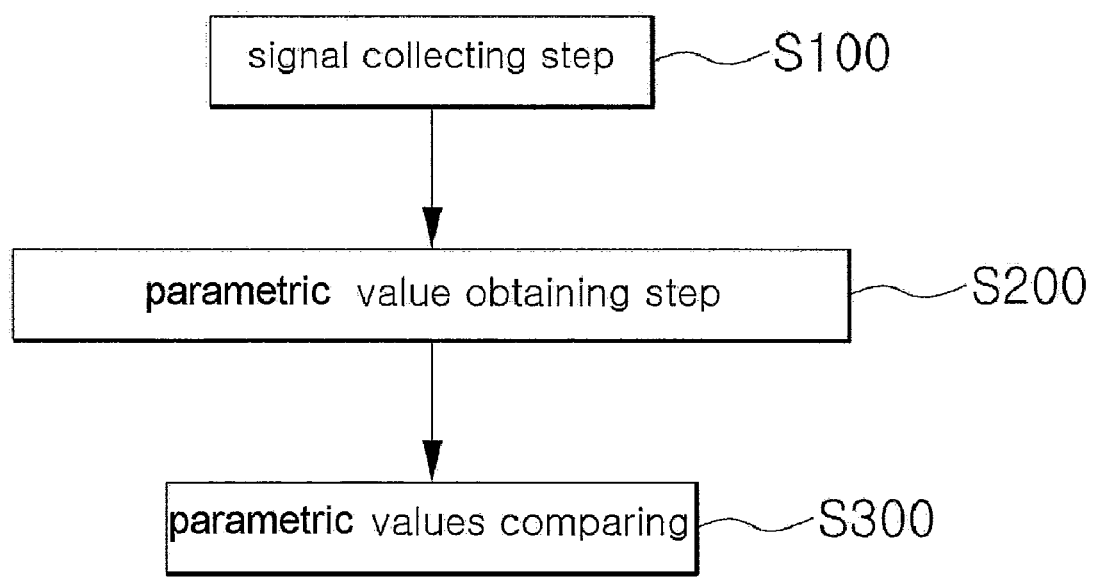
FIG. 3 is a flow chart of the first embodiment of the present invention.
Figure 4:
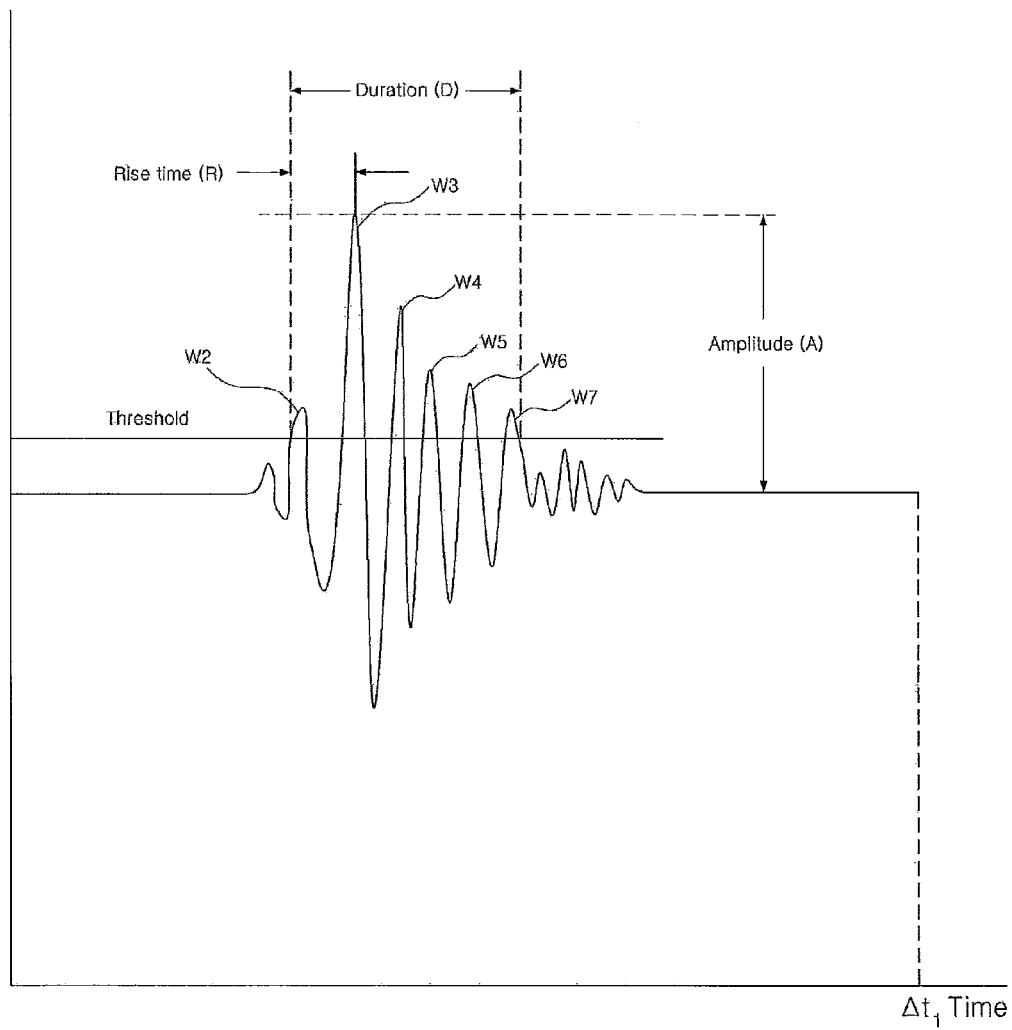
FIG. 4 is a graph of AE signals measured in a signal measuring step of FIG. 3.
Figure 5:
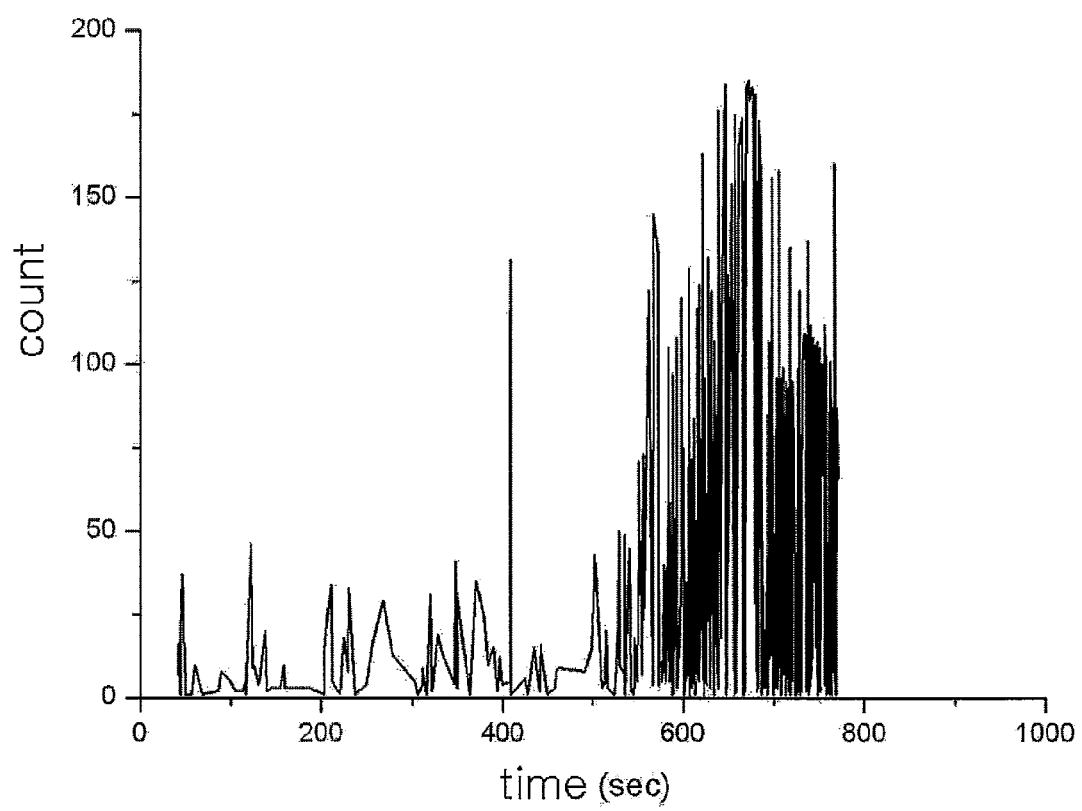
FIG. 5 is a graph of count values obtained in a parametric value obtaining step of FIG. 3.
Figure 6:
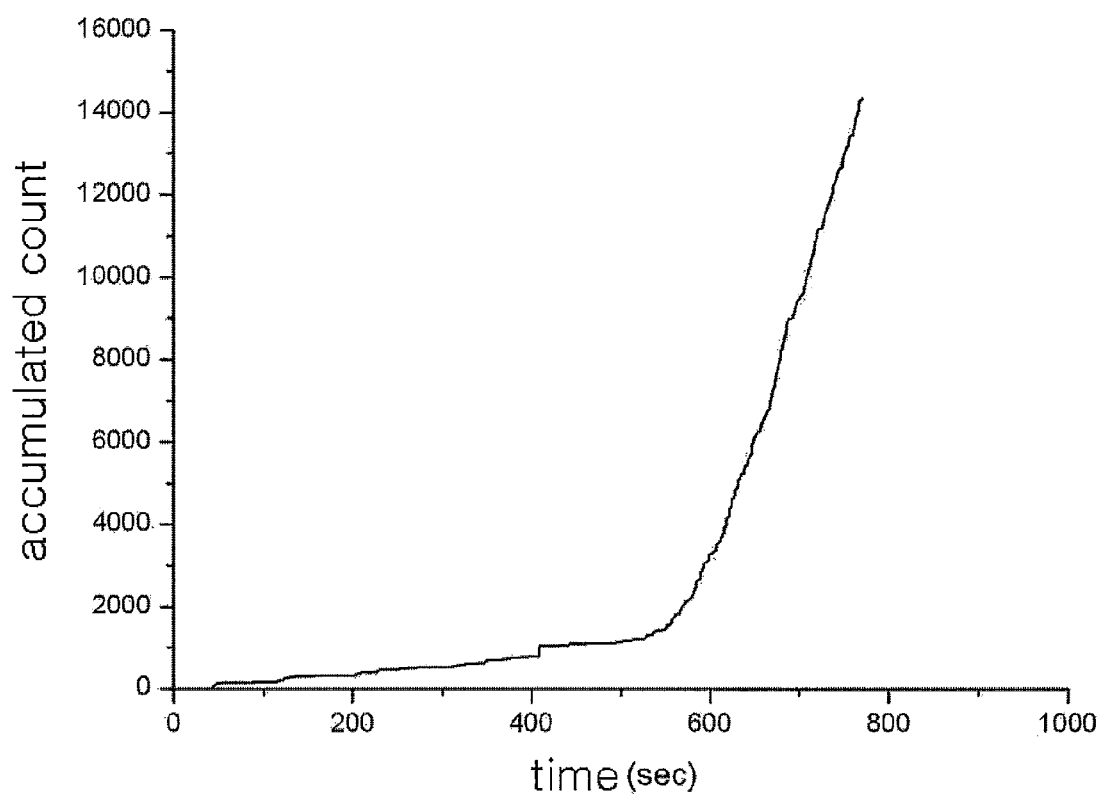
FIG. 6 is a graph of accumulated count values obtained in the parametric value obtaining step of FIG. 3.
Figure 7:
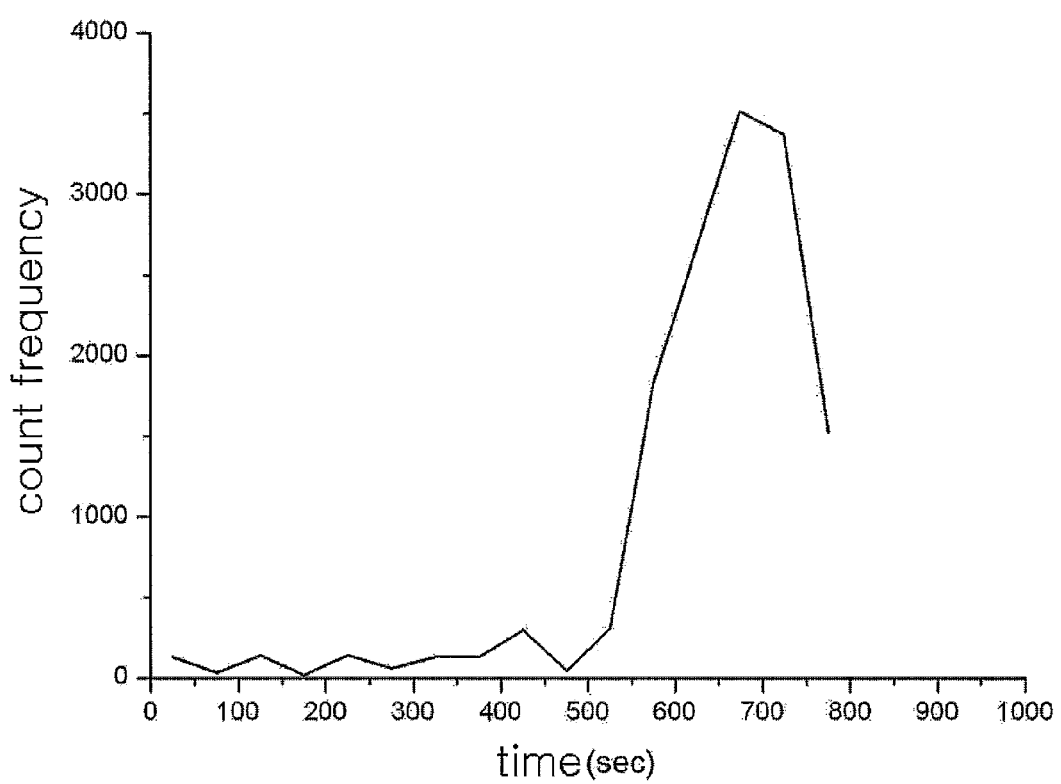
FIG. 7 is a graph of count frequency values obtained in the parametric value obtaining step of FIG. 3.
Figure 8:
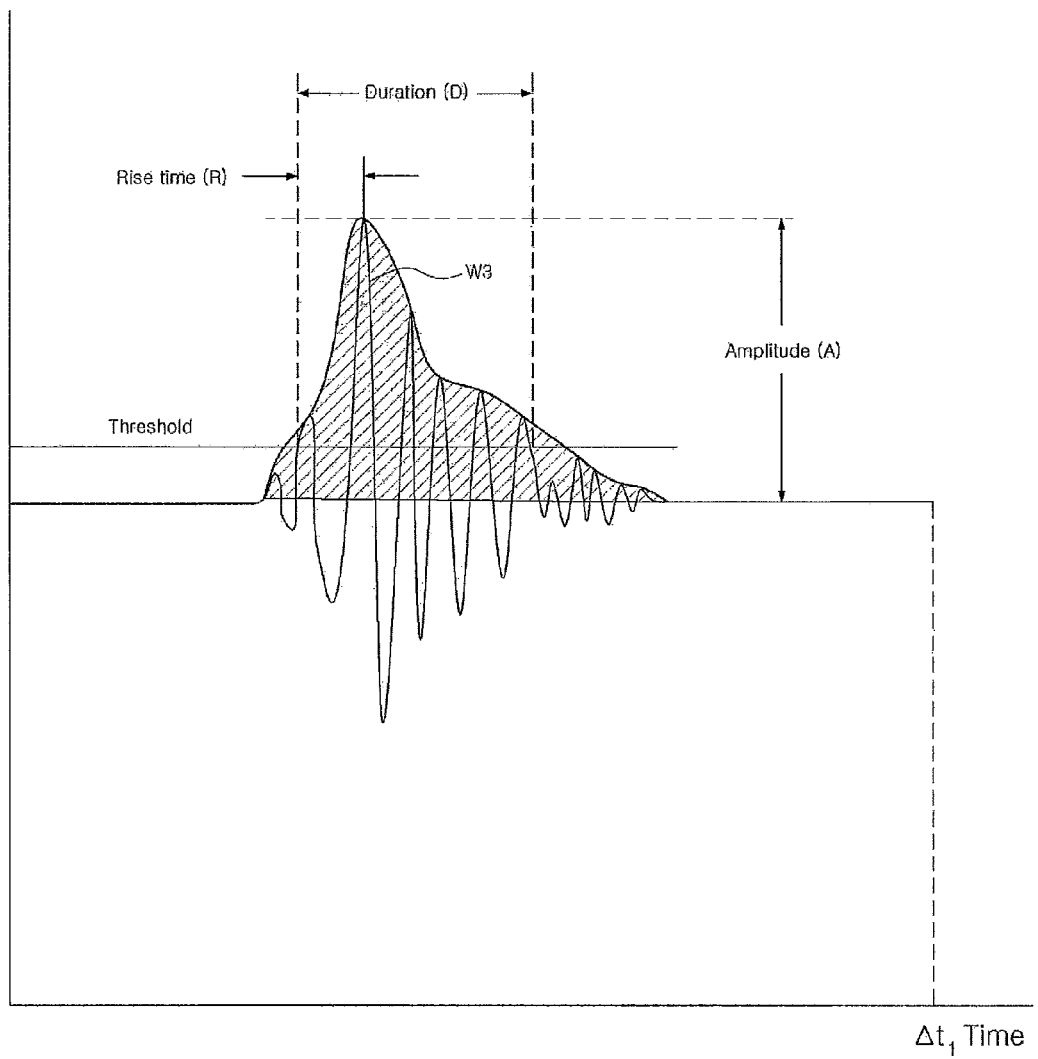
FIG. 8 is a graph of energy values obtained in the parametric value obtaining step of FIG. 3.
Figure 9:
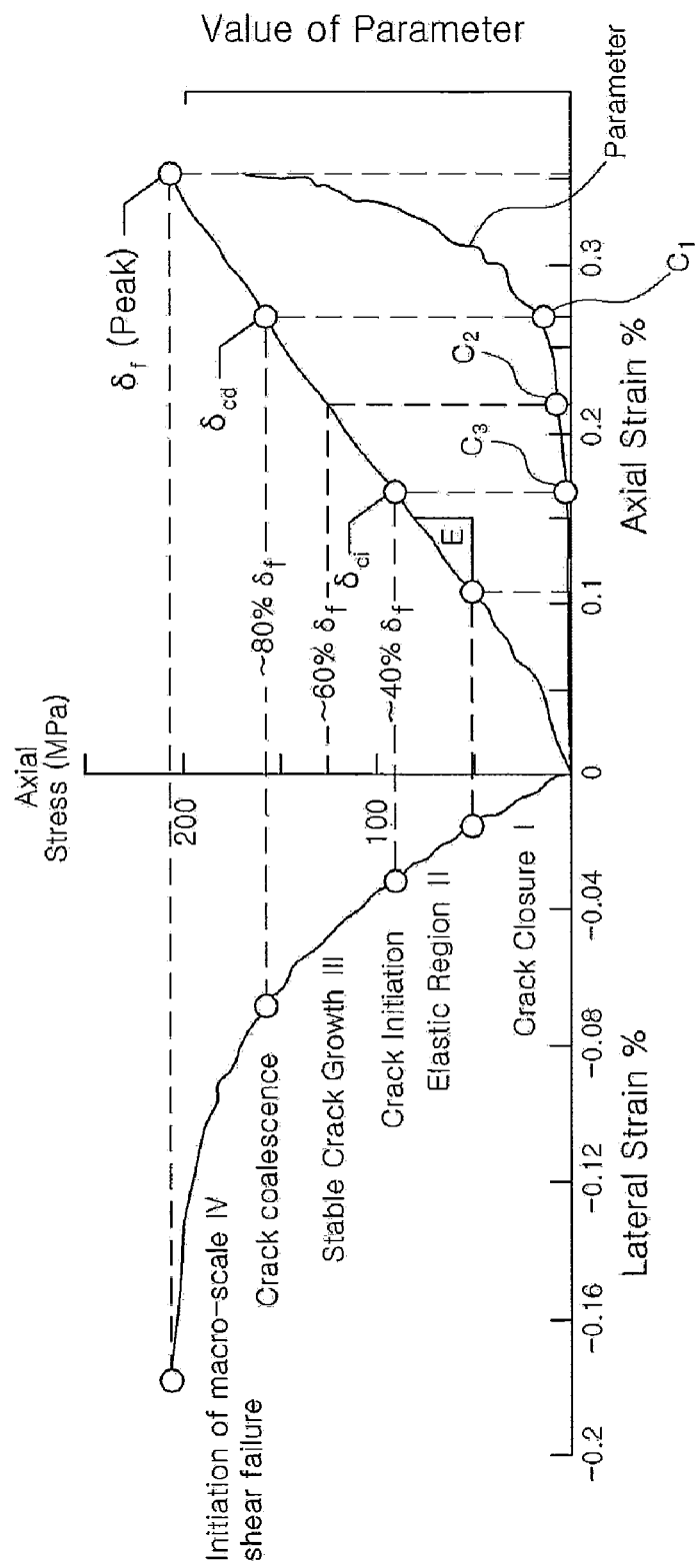
FIG. 9 is a graph showing a relationship between stress values applied in a laboratory compression test and parametric values obtained from AE signals in the laboratory compression test.
Figure 10:
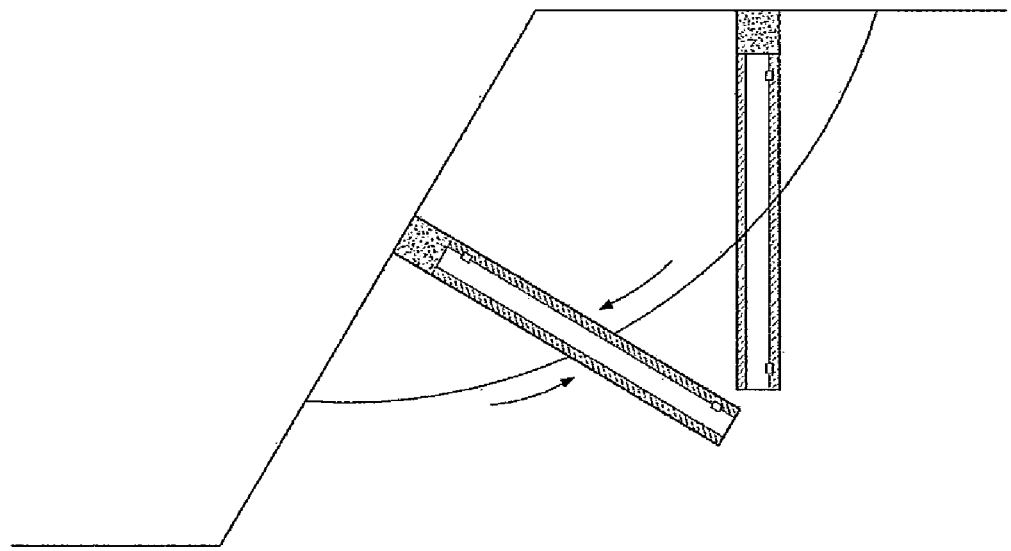
FIG. 10 is a view showing a status that shear failure is occurred in geotechnical structures when the measurement apparatus affixed with AE sensors used in the first embodiment of the present invention is installed.
Figure 11:
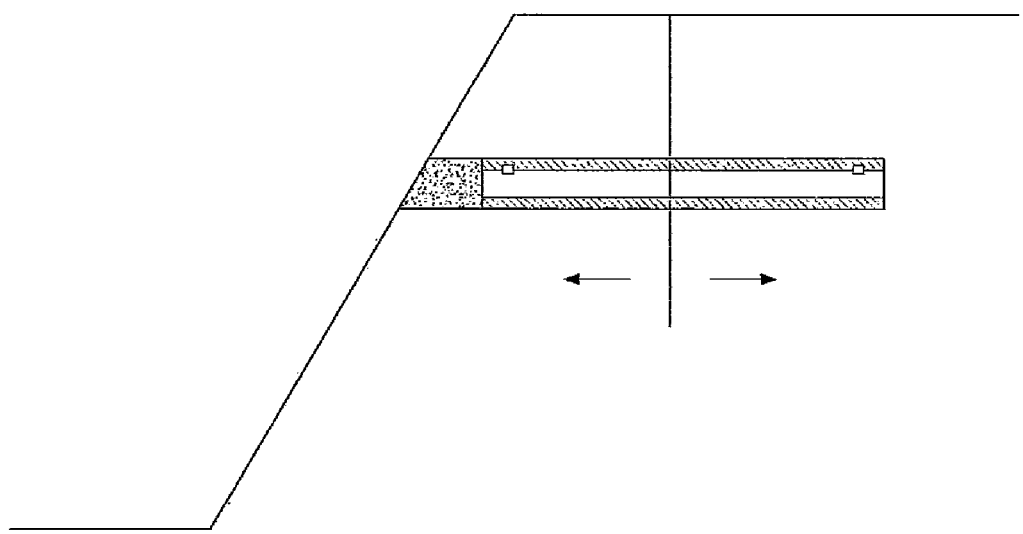
FIG. 11 is a view showing a status that tensile failure is occurred in geotechnical structures when the measurement apparatus affixed with AE sensors used in the first embodiment of the present invention is installed.
Figure 12:
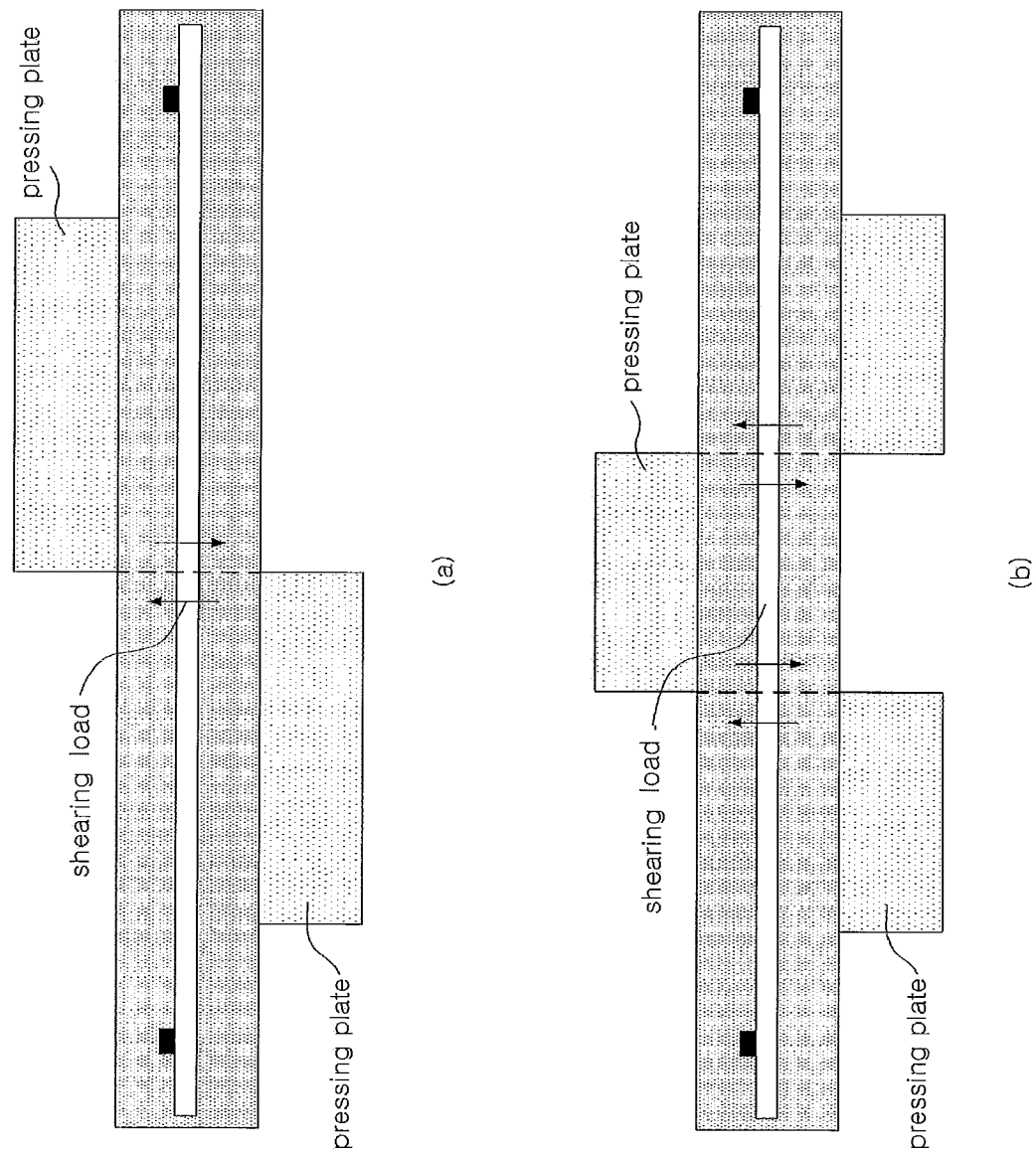
FIG. 12 is a view showing laboratory single-plane shear test and double-plane shear test affixed with respect to an laboratory testing measurement apparatus that is the same as the measurement apparatus affixed with AE sensors used in FIG. 10.
Figure 13:
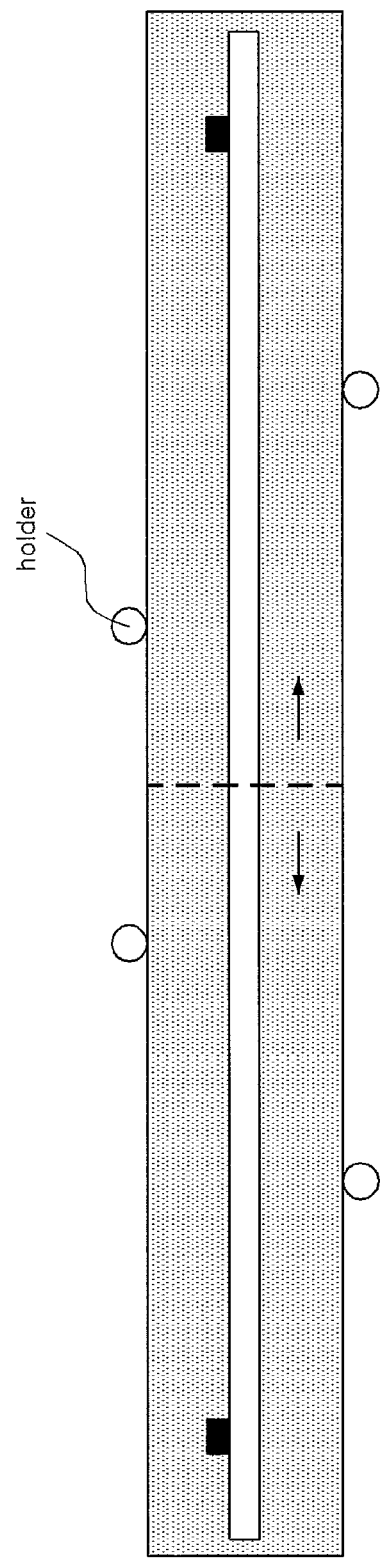
FIG. 13 is a view showing a laboratory tensile test affixed with respect to an laboratory testing measurement apparatus that is the same as the measurement apparatus affixed with AE sensors used in FIG. 10.

FIG. 1 is a schematic view showing an installed state of a measurement apparatus affixed with AE sensors used in a first embodiment of the present invention, FIG. 2 is a schematic view showing a construction of a measurement apparatus set affixed with AE sensors used in a first embodiment of the present invention, FIG. 3 is a flow chart of the first embodiment of the present invention, FIG. 4 is a graph of AE signals measured in a signal measuring step of FIG. 3, FIG. 5 is a graph of count values obtained in a parametric value obtaining step of FIG. 3, FIG. 6 is a graph of accumulated count values obtained in the parametric value obtaining step of FIG. 3, FIG. 7 is a graph of count frequency values obtained in the parametric value obtaining step of FIG. 3, FIG. 8 is a graph of energy values obtained in the parametric value obtaining step of FIG. 3, FIG. 9 is a graph showing a relationship between stress values applied in a laboratory compression test and parametric values obtained from AE signals in the laboratory compression test, FIG. 10 is a view showing a status that shear failure is occurred in geotechnical structures when the measurement apparatus affixed with AE sensors used in the first embodiment of the present invention is installed, FIG. 11 is a view showing a status that tensile failure is occurred in geotechnical structures when the measurement apparatus affixed with AE sensors used in the first embodiment of the present invention is installed, FIG. 12 is a view showing laboratory single-plane shear test and double-plane shear test affixed with respect to a laboratory testing measurement apparatus that is the same as the measurement apparatus affixed with AE sensors used in FIG. 10, and FIG. 13 is a view showing a laboratory tensile test affixed with respect to a laboratory testing measurement apparatus that is the same as the measurement apparatus affixed with AE sensors used in FIG. 10.

Referring to FIG. 1, a measurement apparatus affixed with AE sensors used in a first embodiment of the present invention will be described.

As shown in FIG. 1, the measurement apparatus affixed with AE sensors used in a first embodiment of the present invention includes an inner waveguide 110, an AE sensor 121, 122 and an outer waveguide 130. The inner waveguide 110 may be formed into a straight cylindrical shape. The inner waveguide 110 is formed of a metallic material so as to prevent attenuation of elastic waves.

At least one AE sensor is provided at the inner waveguide 110, and the upper and lower AE sensors 121 and 122 may be provided. The upper and lower AE sensors 121 and 122 are attached to the inner waveguide 110 by using an adhesive couplant. The upper and lower AE sensors 121 and 122 are attached in a length direction of the inner waveguide 110 so as to be spaced apart from each other. The upper and lower AE sensors 121 and 122 are a piezoelectric sensor or a high sensitive accelerometer.

The outer waveguide 130 is attached to an outer surface of the inner waveguide 110. The outer waveguide 130 is attached so as to enclose the upper and lower AE sensors 121 and 122 as well as the inner waveguide 110. The outer waveguide 130 is formed of a homogeneous brittle material. The outer waveguide 130 may be formed of a material having a brittleness of 8 or more so as to be easily broken when an external shock is applied from the geotechnical structures. Further, since the homogeneous material is used, the AE signals generated upon the damage of the outer waveguide 130 are the same as each other regardless of positions of the damage. Since cement has such features and is facilely attached to the outer surface of the inner waveguide 110 formed of a metallic material, the outer waveguide 130 may be formed of cement.

In case that the outer waveguide 130 is formed of cement, the outer waveguide 130 may be a grouting material formed by injecting the cement around the inner waveguide 110 after the inner waveguide 110 on which the upper and lower AE sensors 121 and 122 are attached is inserted into a borehole.

The ground constituting the geotechnical structures is comprised of various rocks and soils and thus the AE signals generated when the ground is damaged are not the same as each other. However, in case that the grounding material is inserted into the borehole, the grouting material is damaged by a particular movement or failure in the geotechnical structures and the AE signals generated by the particular damage of the grouting material may be regarded as being the same as each other. In other words, a part of a failed surface in the geotechnical structures is substituted affixed with the homogenous grouting material, and thus the AE signals generated by the specific damage of the homogenous grouting material becomes the same as each other. Meanwhile, the AE signals generated from the outer waveguide 130 corresponding to the specific movement in the geotechnical structures are arrived at the inner waveguide 110. That is, in case of the measurement apparatus affixed with the AE sensor used in the first embodiment, the AE signals arrived at the inner waveguide 110 are not the AE signals generated from the geotechnical structures but the specific AE signals generated from the outer waveguide 130 corresponding to the specific movement in the geotechnical structures.

In the measurement apparatus affixed with the AE sensor used in the first embodiment as described above, the outer waveguide 130 formed of the brittle material is damaged by the specific movement in the geotechnical structures, and thus the specific AE signals is generated by load applied by the movement in the geotechnical structures regardless of conditions in the geotechnical structures. Therefore, the measurement apparatus affixed with the AE sensor used in the first embodiment precisely predicts the level of the damage and the failure in the geotechnical structures. In other words, laboratory tests such as compression, tensile or shear test are carried out affixed with respect to the same equipment as the measurement apparatus affixed with the AE sensor inserted into the borehole. Data of the AE signals obtained from these tests may be used as a standard for predicting the level of damage and the possibility of failure in the geotechnical structures affixed without compensating or modifying of the data according to actual spot conditions.

Referring to FIG. 1, an installing method of the measurement apparatus affixed with the AE sensor used in the first embodiment will be described.

Firstly, the inner waveguide 110 on which the upper and lower AE sensors 121 and 122 are attached is inserted into the borehole formed at the geotechnical structures. The borehole is formed to pass through an expected failure plane P in the geotechnical structures. A failure surface generated by sliding from an inclined surface or tensile crack can be predicted through a previous analysis like a computer analysis, and this is called as 'expected failure plane'. Assuming that an end of the inner waveguide 110 positioned at an entrance of the borehole is called an outer end, the inner waveguide 110 may be inserted into the borehole by slowly loosening a string 140 which is formed of a non-metallic material and connected affixed with the outer end of the inner waveguide 110. The reason why the string 140 is formed of the non-metallic material is to prevent the upper and lower AE sensors 121 and 122 from detecting an AE signal generated by a shock from the ground.

On the other hands, the outer end of the inner waveguide 110 is disposed to be inserted into the borehole from the entrance thereof in a desired distance or more. Therefore, a space is formed between the entrance of the borehole and the outer end of the inner waveguide 110. The space is filled affixed with an attenuating material 150 so as to prevent shock waves from being transferred to the inner waveguide 110 from an outside.

The inner waveguide 110 may be inserted into the borehole so that the upper and lower AE sensors 121 and 122 are respectively positioned at a different place while the expected failure plane P is interposed between the upper and lower AE sensors 121 and 122. For example, the upper AE sensor 121 is positioned at an upper side of the expected failure plane P and the lower AE sensor 122 is positioned at a lower side of the expected failure plane P.

Then, the outer waveguide 130 is attached to the outer surface of the inner waveguide 110. The outer waveguide 130 is formed by grouting a space between the inner waveguide 110 and the borehole affixed with cement. The cement grouting is formed to at least an upper end of the inner waveguide 110.

Then, the attenuating material 150 is filled from the upper end of the outer waveguide 130 to the entrance of the borehole. The attenuating material 150 functions to prevent an AE signal generated by the external shock from being detected by the upper and lower AE sensors 121 and 122 through the inner waveguide 110. The attenuating material may be sand.

Although not shown in the drawings, the upper AE sensor 121 is connected affixed with a first signal line and the lower AE sensor 122 is connected affixed with a second signal line, and the first and second signal lines are connected to an AE/MS controller 210 (referring to FIG. 2) through the entrance of the borehole.

Referring to FIG. 2, the measurement apparatus set affixed with AE sensors used in the first embodiment of the present invention will be described.

The measurement apparatus set affixed with AE sensors includes the measurement apparatus set affixed with AE sensors shown in FIG. 1, the AE/MS controller 210, an external power supply unit 220, a transmitter module 230, a receiver module 240 and a data sever 250.

The AE/MS controller 210 is connected to each of the upper and lower AE sensors 121 and 122. The AE/MS controller 210 functions to supply power to the upper and lower AE sensors 121 and 122 and also to receive the AE signals measured by the upper and lower AE sensors 121 and 122 and then measure, store and process them.

The AE/MS controller 210 includes a signal conditioner 212, a data acquisition (DAQ) board 214 and a monitoring computer 216.

The signal conditioner 212 functions to supply the power to the upper and lower AE sensors 121 and 122 and receive the AE signals from the upper and lower AE sensors 121 and 122.

The external power supply unit 220 may include a battery 221 and a solar panel 223 so as to supply the power to the AE/MS controller 210. Meanwhile, the external power supply unit 220 may include UPS as an auxiliary power unit against interruption of electric power.

The DAQ board 214 functions to measure, store and process the AE signals transferred through the signal conditioner 212.

The monitoring computer 216 includes a monitor and an alarm unit. The alarm unit functions to give a warning when the failure in the geotechnical structures is predicted.

The transmitter module 230 is connected affixed with the AE/MS controller 210. The transmitter module 230 may be connected affixed with the receiver module 240 through wireless, and the receiver module 240 is connected affixed with the data server 250. The data server 250 functions to deduce a plurality of parameters showing the level of damage in the geotechnical structures from the AE signals received from the AE/MS controller 210 and then predict the level of damage and the failure in the geotechnical structures.

Referring to FIG. 3, the first embodiment includes a step S100 of measuring signals, a step S200 of obtaining parametric values of geotechnical structures and a step S300 of comparing the parametric values.

In the step S100 of measuring the signals, the AE signals generated from the outer waveguide 130 by an event are measured through both or either of the upper and lower AE sensors 121 and 122. FIG. 4 shows an AE signal measured by the upper AE sensor 121. Herein, the "event" means an affair by which an AE sensor detects an AE signal. In other words, when the outer waveguide 130 is damaged by the movement of the ground and thus an AE signal is detected by each of the upper and lower AE sensors 121 and 122, the movement of the ground is the event. In this case, the AE signals detected by the upper and lower AE sensors 121 and 122 are different from each other due to the installation portion of the upper and lower AE sensors 121 and 122 and the like.

The parametric values obtained in the step S200 of obtaining the parametric values in the geotechnical structures may be a count value, an amplitude value, a duration value, a rise time value, an AE energy value and the like of the AE signals measured by the upper AE sensor 121, and also may an accumulated value thereof and a frequency value. Of course, the parametric values may be a count value, an amplitude value, a duration value, a rise time value, an AE energy value and the like of the AE signals measured by the lower AE sensor 122, and also may an accumulated value thereof and a frequency value.

Referring to FIG. 4, the 'count' is a parameter indicated by the number of waveforms, of which amplitudes exceed a threshold value in waveforms forming one of an AE signal generated from the outer waveguide 130 by a specific event. That is, referring to FIG. 4, the AE signal generated from the outer waveguide 130 by a certain event and measured by the upper AE sensor 121 has twelve waveforms. Among them, the number of waveforms of which the amplitudes exceed a threshold value is six, i.e., W2, W3, W4, W5, W6 and W7. Therefore, a count value of the AE signal of FIG. 4 is 6. On the other hand, a period of time for measuring an AE signal using the upper AE sensor 121 is previously set to $\Delta t_1$. The $\Delta t_1$ is a predetermined period of time for measuring an AE signal generated from the outer waveguide 130 by a specific event when multiple different specific events are occurred according to the lapse of time. Therefore, the upper AE sensor 121 measures each AE signal generated from the outer waveguide 130 by the different specific events in a time interval $\Delta t_1$. Thus, the count value is obtained in the time interval $\Delta t_1$. For example, it is assumed that the upper and lower AE sensors 121 and 122 respectively measure a first AE signal at a point of time $t_1 = \Delta t_1$, a second AE signal at a point of time $t_2 = t_1 + \Delta t_1$, and a third AE signal at a point of time $t_3 = t_2 + \Delta t_1$. The count value may be obtained from the first AE signal measured by the upper AE sensor 121 at the point of time $t_1 = \Delta t_1$, the second AE signal measured by the upper AE sensor 121 at the point of time $t_2 = t_1 + \Delta t_1$, and the third AE signal measured by the upper AE sensor 121 at the point of time $t_3 = t_2 + \Delta t_1$. FIG. 5 shows a graph of the count values obtained by such method. However, the count value is not always obtained from only the AE signals measured by the upper AE sensor 121. The count value may be obtained from only the AE signals measured by the lower AE sensor 122, or may be obtained from the AE signals measured by the upper AE sensor 121 at some of points of time $t_1$, $t_2$ and $t_3$ and obtained from the AE signals measured by the lower AE sensor 122 at other points of time. These methods are also applied to obtain other parametric values.

Referring to FIG. 6, an accumulated count value is a parameter which is an accumulative total of the count values affixed with respect to the different specific events according to the lapse of time. The accumulated count value at $t_1 = \Delta t_1$ is a count value at $t_1 = \Delta t_1$, and the accumulated count value at $t_2 = t_1 + \Delta t_1$ is an added value of the accumulated count value at $t_1 = \Delta t_1$ and a count value at $t_2 = t_1 + \Delta t_1$, and the accumulated count value at $t_3 = t_2 + \Delta t_1$ is an added value of the accumulated count value at $t_2 = t_1 + \Delta t_1$ and a count value at $t_3 = t_2 + \Delta t_1$. That is, the accumulated count value is obtained in a time interval $\Delta t_1$.

Referring to FIG. 7, a count frequency value is a parameter which is a total of the count values obtained during a desired time interval $\Delta t_2$ affixed with respect to the different specific events according to the lapse of time. Assuming that k is a natural number equal to or larger than 2, $\Delta t_2$ is $\Delta t_2 = k\Delta t_1$. The count frequency value at $t_{k1} = k\Delta t_1$ is an added value of each count value at $\Delta t_1, 2\Delta t_1, 3\Delta t_1, \ldots, t_{k1} = k\Delta t_1$, and the count frequency value at $t_{k2} = t_{k1} + k\Delta t_1$ is an added value of each count value at $t_{k1} + \Delta t_1, t_{k1} + 2\Delta t_1, t_{k1} + 3\Delta t_1, \ldots, t_{k2} = t_{k1} + k\Delta t_1$, and the count frequency value at $t_{k3} = t_{k2} + k\Delta t_1$ is an added value of each count value at $t_{k2} + \Delta t_1, t_{k2} + 2\Delta t_1, t_{k2} + 3\Delta t_1, \ldots, t_{k3} = t_{k2} + k\Delta t_1$.

Referring to FIG. 5, the count value is remarkably changed at a point of time that is slightly over 400 seconds. However, referring to FIG. 6, the count value at a point of time that is slightly over 400 seconds is just slightly increased in the form of a stair and thus hardly changed. The sharply change in the count value means that large cracks are generated in the geotechnical structures or shocks are applied from an outside. However, it can be understood that this interpretation becomes insignificant in the accumulated count value.

In FIG. 7, the count frequency value at a point of time that is slightly over 400 seconds is higher than that at other point of time. Therefore, it can be understood that the sharply change in the count frequency value may be an indicator showing a sign of failure in the geotechnical structures. Of course, the sharply change in the accumulated count value may be also an indicator for the failure prediction.

In other words, if the count value or the count frequency value is set to a desired value or more, it may be respectively used as an indicator for the failure prediction. However, if the accumulated count value is set to a desired value or more, there is a lot of risk. Therefore, it is proper to set the indicator on the basis of a shape of graph or a change of inclination.

Meanwhile, the parametric value obtained in the step S200 of obtaining the parametric values in the geotechnical structures may be an energy value, an accumulated energy value and an energy frequency value of the AE signal measured by the upper AE sensor 121. Of course, it may be an energy value, an accumulated energy value and an energy frequency value of the AE signal measured by the lower AE sensor 122.

Referring to FIG. 8, the energy value may be a parameter which is indicated by an envelope of a waveform forming one of the AE signals generated from the outer waveguide 130 by a specific event.

The AE signal generated from the outer waveguide 130 by a specific event may be measured by the upper AE sensor 121 or the lower AE sensor 122.

As described above, a period of time for measuring an AE signal using the upper AE sensor 121 is previously set to $\Delta t_1$. The $\Delta t_1$ is a predetermined period of time for measuring an AE signal generated from the outer waveguide 130 by a specific event when multiple different specific events are occurred according to the lapse of time. Therefore, the upper AE sensor 121 measures each AE signal generated from the outer waveguide 130 by the different specific events in a time interval $\Delta t_1$. Thus, the energy value is obtained in the time interval $\Delta t_1$. As described above, it is assumed that the first and lower AE sensors 121 and 122 respectively measure a first AE signal at a point of time $t_1 = \Delta t_1$, a second AE signal at a point of time $t_2 = t_1 + \Delta t_1$, and a third AE signal at a point of time $t_3 = t_2 + \Delta t_1$. The energy value may be obtained from the first AE signal measured by the upper AE sensor 121 at the point of time $t_1 = \Delta t_1$, the second AE signal measured by the upper AE sensor 121 at the point of time $t_2 = t_1 + \Delta t_1$, and the third AE signal measured by the upper AE sensor 121 at the point of time $t_3 = t_2 + \Delta t_1$. However, the energy value is not always obtained from only the AE signals measured by the upper AE sensor 121. The energy value may be obtained from only the AE signals measured by the lower AE sensor 122, or may be obtained from the AE signals measured by the upper AE sensor 121 at some of points of time $t_1$, $t_2$ and $t_3$ and obtained from the AE signals measured by the lower AE sensor 122 at other points of time.

An accumulated energy value is a parameter which is an accumulative total of the energy values affixed with respect to the different specific events according to the lapse of time. The accumulated energy value at $t_1 = \Delta t_1$ is an energy value at $t_1 = \Delta t_1$, and the accumulated energy value at $t_2 = t_1 + \Delta t_1$ is an added value of the accumulated count value at $t_1 = \Delta t_1$ and an energy value at $t_2 = t_1 + \Delta t_1$, and the accumulated energy value at $t_3 = t_2 + \Delta t_1$ is an added value of the accumulated energy value at $t_2 = t_1 + \Delta t_1$ and an energy value at $t_3 = t_2 + \Delta t_1$. That is, the accumulated energy value is obtained in a time interval $\Delta t_1$.

An energy frequency value is a parameter which is a total of the energy values obtained during a desired time interval $\Delta t_2$ affixed with respect to the different specific events according to the lapse of time. Assuming that k is a natural number equal to or larger than 2, $\Delta t_2$ is $\Delta t_2 = k\Delta t_1$. The energy frequency value at $t_{k1} = k\Delta t_1$ is an added value of each energy value at $\Delta t_1$, $2\Delta t_1, 3\Delta t_1, \ldots, t_{k1}=k\Delta t_1$, and the energy frequency value at $t_{k2}=t_{k1}+k\Delta t_1$ is an added value of each energy value at $t_{k1}+\Delta t_1$, $t_{k1}+2\Delta t_1, t_{k1}+3\Delta t_1, \ldots, t_{k2}=t_{k1}+k\Delta t_1$, and the energy frequency value at $t_{k3}=t_{k2}+k\Delta t_1$ is an added value of each energy value at $t_{k2}+\Delta t_1, t_{k2}+2\Delta t_1, t_{k2}+3\Delta t_1, \ldots, t_{k3}=t_{k2}+k\Delta t_1$.

On the other hand, the energy value may be a parameter which is indicated by a maximum amplitude of the waveform forming one of AE signals generated from the outer waveguide 130 by a specific event. In case of the AE signal shown in FIG. 8, the waveform having the maximum amplitude is W3, and W3 has an amplitude $A_{max}$. The description of the parametric value in the case that the energy value is indicated by the maximum amplitude of the waveform forming one of the AE signals generated from the outer waveguide 130 by a specific event applies correspondingly to the case that the energy value is indicated by an envelope of a waveform forming one of the AE signals generated from the outer waveguide 130 by a specific event.

In order to perform the step S300 of comparing the parametric values, the AE signals are measured by a laboratory tensile, shear and compression test affixed with respect to a laboratory testing measurement apparatus that is the same as the measurement apparatus affixed with AE sensors used in FIG. 1, and the parametric values corresponding to the parametric values obtained in the step S200 of obtaining the parametric values in the geotechnical structures are obtained from the measured AE signals, and then at least one or more reference parametric values which indicate a standard for a damage level in the geotechnical structures is selected from the parametric values obtained from the laboratory testing measurement apparatus affixed with AE sensors. In the step S300 of comparing the parametric values, the selected reference parametric values and the parametric values obtained in the step S200 of obtaining the parametric values in the geotechnical structures are compared affixed with each other so as to predict the failure in the geotechnical structures. Meanwhile, the laboratory testing measurement apparatus affixed with AE sensors is the same as the measurement apparatus affixed with AE sensors, which is fixedly inserted into the borehole.

On the other hand, the parametric values corresponding to the parametric values obtained in the step S200 of obtaining the parametric values in the geotechnical structures may be reference coefficients $C_1$, $C_2$ and $C_3$. The reference coefficient $C_1$ may be a value when load corresponding to 80% of failure strength is applied to the outer waveguide of the laboratory testing measurement apparatus affixed with AE sensors used in the laboratory test, and the reference coefficient $C_2$ may be a value when load corresponding to 60% of failure strength is applied to the outer waveguide of the laboratory testing measurement apparatus affixed with AE sensors used in the laboratory test, and the reference coefficient $C_3$ may be a value when load corresponding to 40% of failure strength is applied to the outer waveguide of the laboratory testing measurement apparatus affixed with AE sensors used in the laboratory test.

In the step S300 of comparing the parametric values, the parametric values obtained in the step S200 of obtaining the parametric values in the geotechnical structures and the reference coefficients $C_1$, $C_2$ and $C_3$ selected from the reference parametric value corresponding to them are compared affixed with each other. If the parametric value obtained in the step S200 of obtaining the parametric values in the geotechnical structures is larger than the reference coefficient $C_1$, it may be determined as a dangerous state, and if the parametric value obtained in the step S200 of obtaining the parametric values in the geotechnical structure is a value between the reference coefficients $C_1$ and $C_2$, it may be determined as a warning state, and if the parametric value obtained in the step S200 of obtaining the parametric values in the geotechnical structures is a value between the reference coefficients $C_2$ and $C_3$, it may be determined as a suspicious state, and if the parametric value obtained in the step S200 of obtaining the parametric values in the geotechnical structures is less than the reference coefficient $C_3$, it may be determined as a safe state. In other words, the reference coefficient $C_1$ is a value for evaluating where the damage level in the geotechnical structures corresponds a 'dangerous level' in which a macro-failure in the geotechnical structures may be occurred, and the reference coefficient $C_2$ is a value for evaluating where the damage level in the geotechnical structures corresponds to a 'damage developing level' in which the geotechnical structures are sharply damaged and thus can proceed to the 'dangerous level', and the reference coefficient $C_3$ is a value for evaluating where the damage level in the geotechnical structures passes a 'safe level' in which the geotechnical structures are insignificantly damaged or not damaged, and then arrive at a 'damage proceeding level' in which the geotechnical structures are slowly damaged and thus can proceed to the 'damage developing level'.

That is, in order to perform the step S300 of comparing the parametric values, it is necessary to perform a compression test affixed with respect to a laboratory testing measurement apparatus affixed with AE sensors that is the same as the measurement apparatus affixed with AE sensors and obtain at least one of the count value, the accumulated count value, the count frequency value, the energy value, the accumulated energy value and the energy frequency value. In order to use the count value as a reference for evaluating the damage level in the geotechnical structures, it is necessary to select at least one of the count values obtained from the compression test as a reference parameter. Hereinafter, it is assumed that the parametric values in FIG. 9 are the count values. According to a result of the compression test affixed with respect to the laboratory testing measurement apparatus affixed with AE sensors, as shown in FIG. 9, the count value is slowly increased at a crack initiation stress $\sigma_{ci}$ corresponding to 40% of failure strength $\sigma_{f(peak)}$ and then sharply increased at a crack damage stress $\sigma_{cd}$ corresponding to 80% of failure strength $\sigma_{f(peak)}$. Therefore, in case that the count value is used as the reference for evaluating the damage level in the geotechnical structures, the reference coefficient $C_1$ is the count value when the crack initiation stress $\sigma_{ci}$ corresponding to 40% of failure strength $\sigma_{f(peak)}$ is generated, and the reference coefficient $C_2$ is the count value when the stress corresponding to 60% of failure strength $\sigma_{f(peak)}$ is generated, and the reference coefficient $C_3$ is the count value when the crack damage stress $\sigma_{cd}$ corresponding to 80% of failure strength $\sigma_{f(peak)}$ is generated.

The description of the case that other parametric values obtained by performing the compression test is used as the reference for evaluating the damage level in the geotechnical structures applies correspondingly to the case that the count value is used as the reference for evaluating the damage level in the geotechnical structures.

Meanwhile, the description of the case that one of the parametric values obtained by performing the tensile or shear test applies correspondingly to the case that the count values obtained by performing the compression test is used as the reference for evaluating the damage level in the geotechnical structures.

FIG. 10 is a view showing a status that shear failure is occurred in geotechnical structures when the measurement apparatus affixed with AE sensors used in the first embodiment of the present invention is installed, FIG. 11 is a view showing a status that tensile failure is occurred in geotechnical structures when the measurement apparatus affixed with AE sensors used in the first embodiment of the present invention is installed, FIG. 12 is a view showing laboratory single-plane shear test and double-plane shear test affixed with respect to a laboratory testing measurement apparatus that is the same as the measurement apparatus affixed with AE sensors used in FIG. 10, and FIG. 13 is a view showing a laboratory tensile test affixed with respect to a laboratory testing measurement apparatus that is the same as the measurement apparatus affixed with AE sensors used in FIG. 10.

Referring to FIGS. 10 and 12, in case that shear failure in the geotechnical structures is occurred, one (e.g., count value) of the parametric values obtained in the step S200 of obtaining the parametric values in the geotechnical structures is compared affixed with the reference coefficients $C_1$, $C_2$ and $C_3$ of corresponding parametric values (e.g., count value) obtained from the shear test, and then it is determined where the geotechnical structure corresponds to the damage level corresponding to the reference coefficient $C_1$, $C_2$ or $C_3$.

Referring to FIGS. 11 and 13, in case that tensile failure in the geotechnical structures is occurred, one (e.g., count value) of the parametric values obtained in the step S200 of obtaining parametric values of geotechnical structures is compared affixed with the reference coefficients $C_1$, $C_2$ and $C_3$ of corresponding parametric values (e.g., count value) obtained from the tensile test, and then it is determined where the geotechnical structures correspond to the damage level from the reference coefficient $C_1$, $C_2$ or $C_3$.

Since the ground constituting the geotechnical structures is comprised of various rocks and soils, the AE signals generated by the damage of the ground are not the same as each other. However, in the first embodiment, since the outer waveguide 130 formed of a brittle material is attached to the inner waveguide 110 so as to enclose the inner waveguide 110, the outer waveguide 130 is damaged when the geotechnical structures are moved or failed. Meanwhile, if the outer waveguide 130 formed of a brittle material is damaged by the movement or failure in the geotechnical structures, the AE signals generated by the specific damage of the outer waveguide 130 are the same as each other. That is, the outer waveguide 130 formed of the homogenous brittle material is accordingly damaged by the specific movement or failure in the geotechnical structures. The AE signals generated from the outer waveguide 130 are the same each other due to the specific damage of the outer waveguide 130. Meanwhile, the specific AE signals generated from the outer waveguide 130 by the specific movement in the geotechnical structures arrive at the inner waveguide 110. That is, in the first embodiment, the inner waveguide 110 does not receive the AE signals generated by the geotechnical structures, but receives the signals generated from the outer waveguide 130 by the specific movement in the geotechnical structures.

As described above, in the first embodiment, since the outer waveguide 130 formed of the brittle material is accordingly damaged by the movement in the geotechnical structures, the specific AE signals are generated by the movement in the geotechnical structures regardless of conditions of the ground. Therefore, in the first embodiment, the results obtained from the laboratory tests using the same inner and outer waveguides as those installed in the geotechnical structures is used as a standard for predicting the level of damage and the possibility of failure in the geotechnical structures affixed without compensating or modifying of the results according to actual spot conditions.

Second Embodiment

Figure 14:
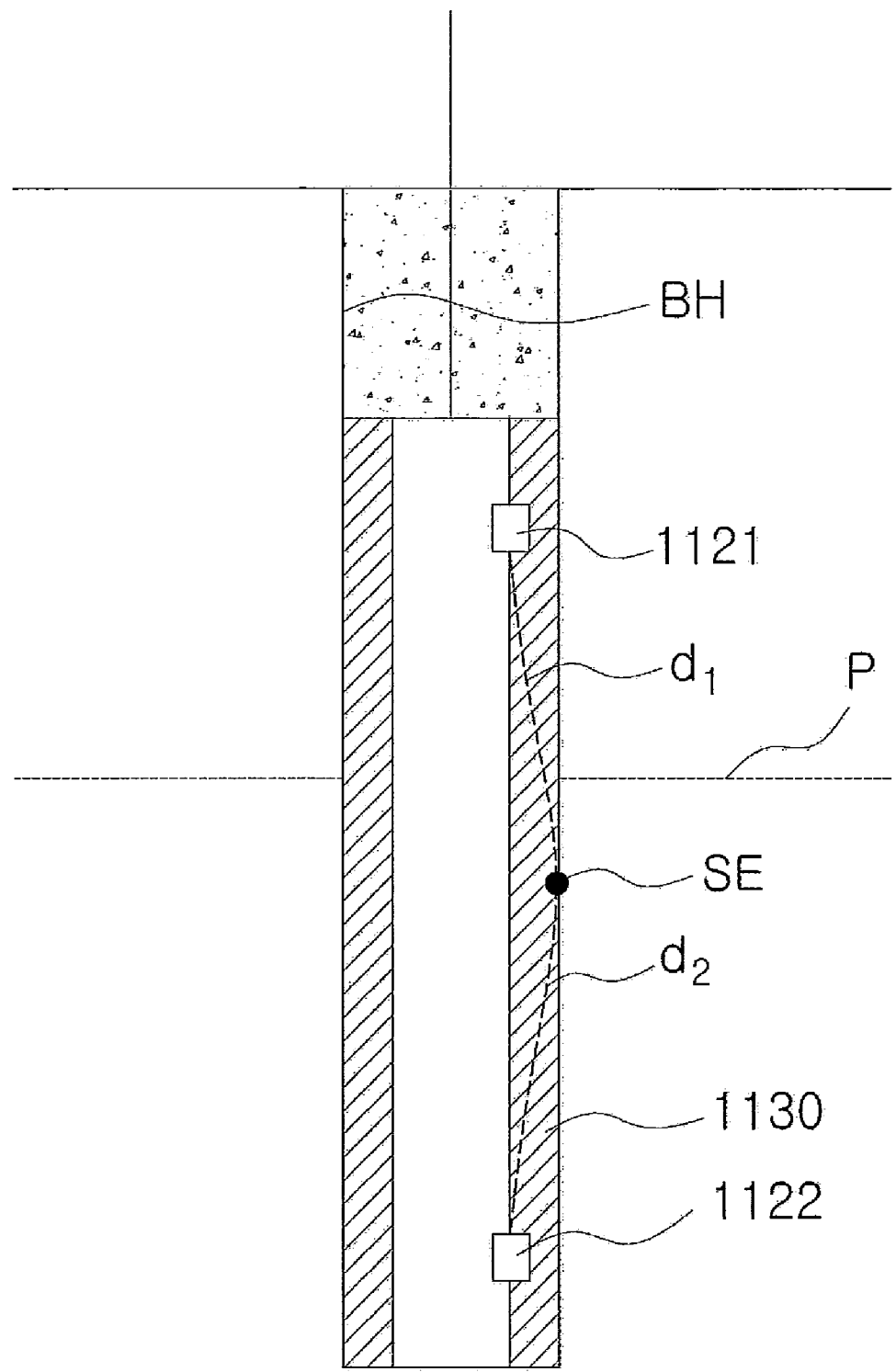
FIG. 14 is a schematic view showing an installed state of a measurement apparatus affixed with AE sensors used in a second embodiment of the present invention.

A second embodiment relates to another method of predicting failure in the geotechnical structures in accordance affixed with the present invention. FIG. 14 is a schematic view showing an installed state of a measurement apparatus affixed with AE sensors used in a second embodiment of the present invention, and FIG. 15 is a flow chart of the second embodiment of the present invention, FIG. 16 is a graph of AE signals measured in a signal measuring step of FIG. 14, and FIG. 17 a graph showing a relationship between stress values applied in a laboratory compression test and parametric values obtained from AE signals in the laboratory compression test.

Referring to FIG. 14, the measurement apparatus affixed with AE sensors used in the second embodiment, unlike in the first embodiment, includes a upper AE sensor 1121 and a lower AE sensor 1122 which are respectively disposed at one side and the other side so that an expected failure plane P is interposed between the upper and lower AE sensors 1121 and 1122. That is, unlike in the first embodiment, the measurement apparatus affixed with AE sensors used in the second embodiment includes at least two or more AE sensors.

Other points except that are the same as those in the first embodiment. Also, the measurement apparatus set affixed with AE sensors used in the second embodiment is the same as that in the first embodiment.

Figure 15:
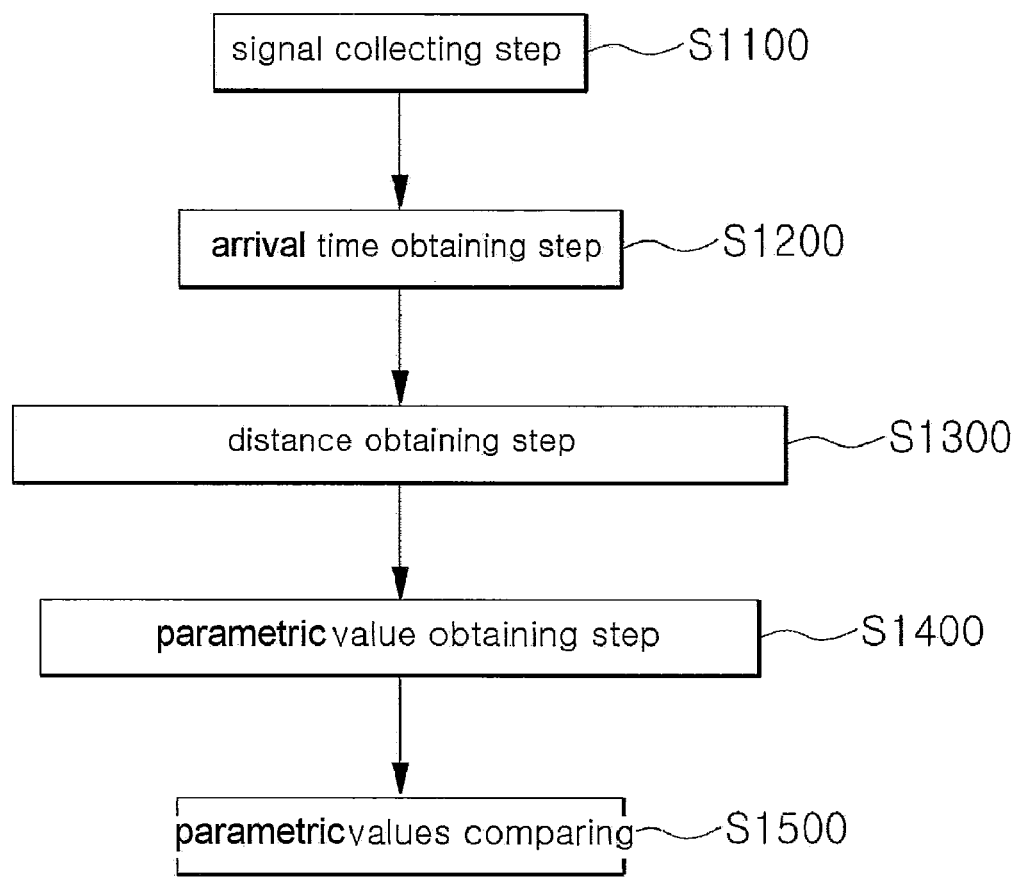
FIG. 15 is a flow chart of the second embodiment of the present invention.
Figure 16:
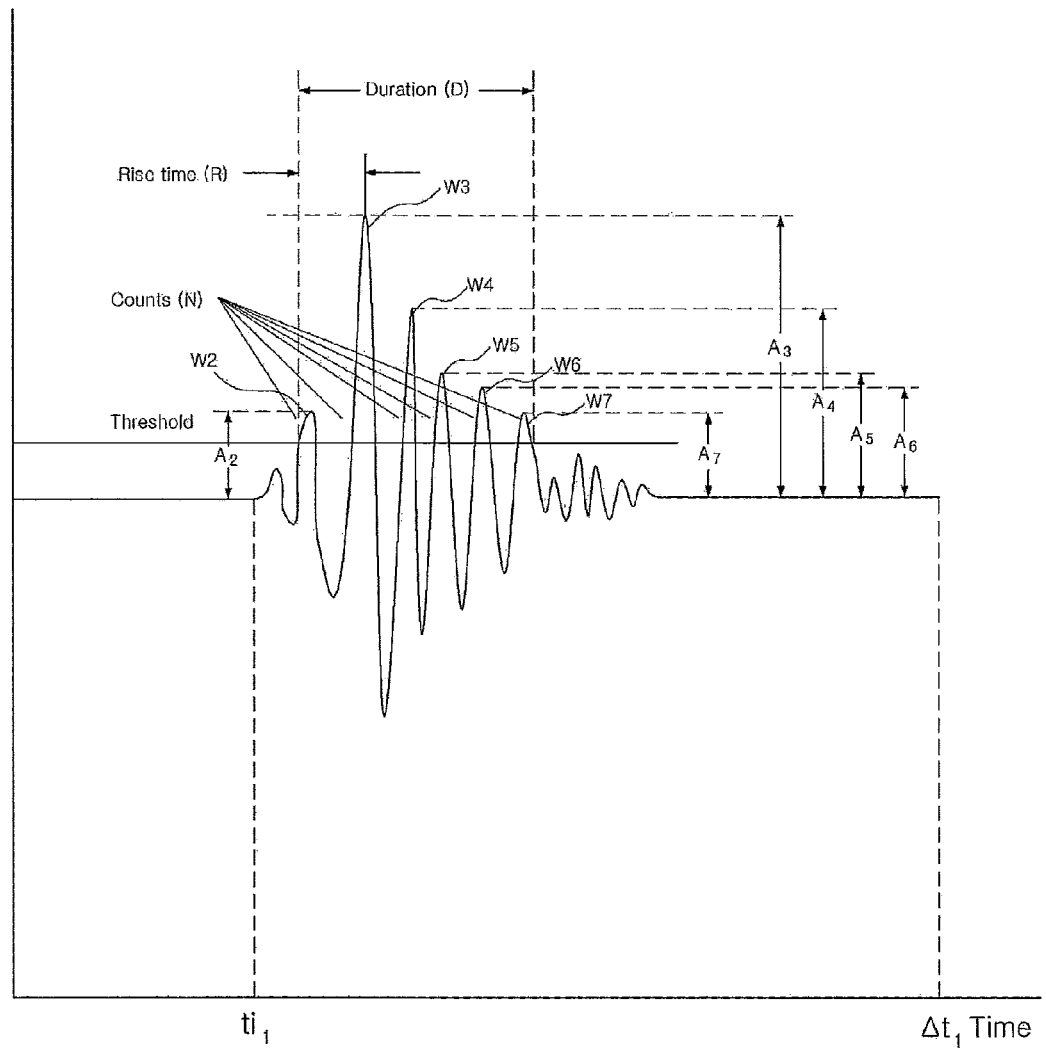
FIG. 16 is a graph of AE signals measured in a signal measuring step of FIG. 14.

Referring to FIG. 15, the second embodiment includes a step S1100 of measuring signals, a step S1200 of obtaining arrival time, a step S1300 of obtaining a distance from a specific sound source, a step S1400 of obtaining parametric values in geotechnical structures and a step S1500 of comparing the parametric values.

In the step S1100 of measuring signals, the AE signals generated from the outer waveguide 1130 by an event are measured through both of the upper and lower AE sensors 1121 and 1122. FIG. 16 shows an AE signal measured by the upper AE sensor 1121.

The step S1200 of obtaining the arrival time obtains an arrival time $t_{t1}$ when an initial waveform having an amplitude arrive at the upper AE sensor 1121 from an AE signal generated from the outer waveguide 1130 by a specific event and measured by the upper AE sensor 1121, and an arrival time $t_{t2}$ when an initial waveform having an amplitude arrive at the lower AE sensor 1122 from an AE signal generated from the outer waveguide 1130 by a specific event and measured by the lower AE sensor 1122. FIG. 16 shows the arrival time $t_{t1}$ when the initial waveform W1 having the amplitude arrive at the upper AE sensor 1121.

Referring to FIG. 14, the outer waveguide 1130 is damaged by a specific event, and an AE signal generated by the damage of the outer waveguide 1130 is detected by each of the upper and lower AE sensors 1121 and 1122. A damaged position of the outer waveguide 1130 that generates the AE signal to each of the upper and lower AE sensors 1121 and 1122 is defined as a sound source SE of the AE signal generated by a specific event. The sound source SE is generally changed according to the event.

In the step S1300 of obtaining the distance from the specific sound source, a distance $d_1$ between the upper AE sensor 1121 and the sound source SE of the AE signal generated from the outer waveguide 1130 by the specific event and measured by the upper AE sensor 1121 and a distance $d_2$ between the lower AE sensor 1122 and the sound source SE of the AE signal generated from the outer waveguide 1130 by the specific event and measured by the lower AE sensor 1121 are respectively obtained from a difference between the arrival time $t_{i1}$ obtained from the AE signal measured by the upper AE sensor 1121 and the arrival time $t_{i2}$ obtained from the AE signal measured by the lower AE sensor 1122.

The step S1400 of obtaining the parametric values in the geotechnical structures obtains the parametric values, which indicate a damage level in the geotechnical structures so as to predict failure in the geotechnical structures, from the AE signal measured by at least one of the upper and lower AE sensors 1121 and 1122.

The parametric values obtained in the step S1400 of obtaining the parametric values in the geotechnical structures may be summed magnitude values, accumulated summed magnitude values and summed magnitude frequency values of the AE signals measured by the upper AE sensor 1121. Of course, the parametric values obtained in the step S1400 of obtaining the parametric values in the geotechnical structures may be summed magnitude values, accumulated summed magnitude values and summed magnitude frequency values of the AE signals measured by the lower AE sensor 1122.

The summed magnitude is a parameter which is measured during a predetermined period of time for measuring an AE signal generated from the outer waveguide 1130 by a specific event according to the lapse of time and indicated by $G(d)\Theta F(E)$.

d is a distance between a one of the upper and lower AE sensors 1121 and 1122, which measures the AE signal used in obtaining the add magnitude value, and the sound source SE of the AE signal used in obtaining the add magnitude value. d is obtained in the step S1300 of obtaining the distance from the specific sound source.

G(d) is an attenuating function according to d, $\Theta$ is an operator decided by G(d). The AE signal belongs to an elastic wave. In general, the AE signal is linearly attenuated when passing through a material. It is well known that the AE signal is sometimes attenuated in an exponential function manner. Therefore, if the AE signal is linearly attenuated, it is indicated by $G(d)=A_1 d+A_2$, and if it is attenuated in an exponential function manner, it is indicated by $G(d)=B_1 e^{-d}+B_2$, wherein $A_1, A_2, B_1$ and $B_2$ are regression coefficients which are decided in the second embodiment by a material of the inner waveguide.

F(E) is an energy function of the AE signal used in obtaining of the summed magnitude value. F(E) may be $$\log\left(\frac{ppA}{2\pi f}\right), \log\left(\sqrt{\frac{\sum_{j=1}^{n} A_j^2}{n}}\right)$$

and $dB_{peak}$.

In $$\log\left(\frac{ppA}{2\pi f}\right),$$

ppA is a maximum particle acceleration of the AE signal used in obtaining the summed magnitude value, and f is a dominant frequency of the AE signal used in obtaining the summed magnitude value.

In $$\log\left(\sqrt{\frac{\sum_{j=1}^{n} A_j^2}{n}}\right),$$

n is a count of the AE signal used in obtaining the summed magnitude value, $A_j$ is an amplitude of a j-th waveform forming the AE signal used in obtaining the summed magnitude value, which is over a threshold value. A value of $$\log\left(\sqrt{\frac{\sum_{j=1}^{n} A_j^2}{n}}\right)$$

affixed with respect to the AE signal shown in FIG. 16 is $$\log\left(\sqrt{\frac{\sum_{j=1}^{n} A_j^2}{n}}\right) = \log\left(\sqrt{\frac{A_2^2 + A_3^2 + A_4^2 + A_5^2 + A_6^2 + A_7^2}{7}}\right),$$

wherein $A_2$ is an amplitude of W2, $A_3$ is an amplitude of W3, $A_4$ is an amplitude of W4, $A_5$ is amplitude of W5, $A_6$ is an amplitude of W6, and $A_7$ is an amplitude of W7.

$dB_{peak}$ is a maximum amplitude in the waveform of the AE signal used in obtaining the summed magnitude value. A value of $dB_{peak}$ shown in FIG. 16 is $A_3$.

The accumulated summed magnitude is a parameter which is an accumulative total of the count values affixed with respect to the different specific events according to the lapse of time. A method of obtaining the accumulated summed magnitude value applies correspondingly to the method of obtaining the accumulated count value or the accumulated energy value in the first embodiment. That is obtained in a time interval $\Delta t_1$.

The summed magnitude frequency value is a parameter which is a total of the summed magnitude values obtained during a predetermined time interval $\Delta t_2$ affixed with respect to different specific events according to the lapse of time. Assuming that k is a natural number equal to or larger than 2, $\Delta t_2$ is $\Delta t_2 = k \Delta t_1$. A method of obtaining the summed magnitude frequency value applies correspondingly to the method of obtaining the accumulated count value or the energy frequency value in the first embodiment.

In order to perform the step S1500 of comparing the parametric values, the AE signals are measured by a laboratory tensile, shear and compression test affixed with respect to a laboratory testing measurement apparatus that is the same as the measurement apparatus affixed with AE sensors used in FIG. 14, and the parametric values corresponding to the parametric values obtained in the step S1400 of obtaining the parametric values in the geotechnical structures are obtained from the measured AE signals, and then at least one or more reference parametric values which indicate a standard for a damage level in the geotechnical structures is selected from the parametric values obtained from the laboratory testing measurement apparatus affixed with AE sensors. In the step S1500 of comparing the parametric values, the selected reference parametric values and the parametric values obtained in the step S1400 of obtaining the parametric values in the geotechnical structures are compared affixed with each other so as to predict the failure in the geotechnical structures.

In order to obtain the parametric values corresponding to the parametric values obtained from the AE signals measured at the laboratory tests through the step S1400 of obtaining the parametric values in the geotechnical structures, it is necessary to obtain a distance between the sound source of the specific AE signal measured through the laboratory tensile, shear and compression tests and the upper or lower AE sensor 1121 or 1122 used for measuring the specific AE signal. The description thereof is the same as that in the step S1200 of obtaining the arrival time and the step S1300 of obtaining the distance from the specific sound source.

On the other hand, the parametric values corresponding to the parametric values obtained in the step S1400 of obtaining the parametric values in the geotechnical structures may be reference coefficients $C_1$, $C_2$ and $C_3$. The reference coefficient $C_1$ may be a value when load corresponding to 80% of failure strength is applied to the laboratory testing measurement apparatus affixed with AE sensors used in the laboratory test, and the reference coefficient $C_2$ may be a value when load corresponding to 60% of failure strength is applied to the laboratory testing measurement apparatus affixed with AE sensors used in the laboratory test, and the reference coefficient $C_3$ may be a value when load corresponding to 40% of failure strength is applied to the laboratory testing measurement apparatus affixed with AE sensors used in the laboratory test.

In the step S1500 of comparing the parametric values, the parametric values obtained in the step S1400 of obtaining the parametric values in the geotechnical structures and the reference coefficients $C_1$, $C_2$ and $C_3$ selected from the reference parametric value corresponding to them are compared affixed with each other. If the parametric value obtained in the step S200 of obtaining the parametric values in the geotechnical structures is larger than the reference coefficient $C_1$, it may be determined as a dangerous state, and if the parametric value obtained in the step S1400 of obtaining the parametric values in the geotechnical structures is a value between the reference coefficients $C_1$ and $C_2$, it may be determined as a warning state, and if the parametric value obtained in the step S200 of obtaining the parametric values in the geotechnical structures is a value between the reference coefficients $C_2$ and $C_3$, it may be determined as a suspicious state, and if the parametric value obtained in the step S200 of obtaining the parametric values in the geotechnical structures is less than the reference coefficient $C_3$, it may be determined as a safe state.

Figure 17:
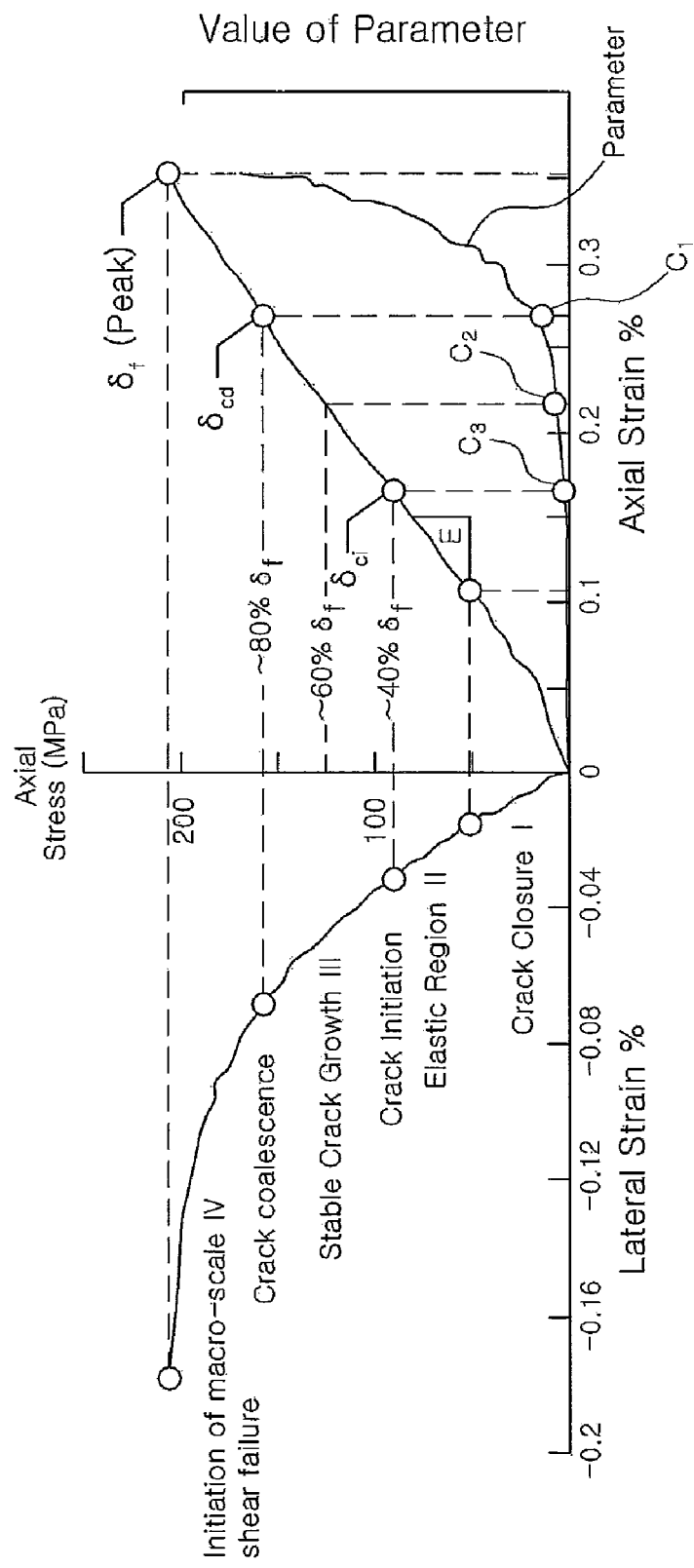
FIG. 17 a graph showing a relationship between stress values applied in a laboratory compression test and parametric values obtained from AE signals in the laboratory compression test.

That is, in order to perform the step S1500 of comparing the parametric values, it is necessary to perform a compression test affixed with respect to a laboratory testing measurement apparatus affixed with AE sensors that is the same as the measurement apparatus affixed with AE sensors and obtain at least one of the summed magnitude value, the accumulated summed magnitude value the summed magnitude frequency value. In order to use the summed magnitude value as a reference for evaluating the damage level in the geotechnical structures, it is necessary to select at least one of the summed magnitude values obtained from the compression test as a reference parameter. Hereinafter, it is assumed that the parametric values in FIG. 17 are the summed magnitude values. According to a result of the compression test affixed with respect to the laboratory testing measurement apparatus affixed with AE sensors, as shown in FIG. 17, the summed magnitude value is slowly increased at a crack initiation stress $\sigma_{ci}$ corresponding to 40% of failure strength $\sigma_{f(peak)}$ and then sharply increased at a crack damage stress $\sigma_{cd}$ corresponding to 80% of failure strength $\sigma_{f(peak)}$. Therefore, in case that the summed magnitude value is used as the reference for evaluating the damage level in the geotechnical structures, the reference coefficient $C_1$ is the summed magnitude value when the crack initiation stress $\sigma_{ci}$ corresponding to 40% of failure strength $\sigma_{f(peak)}$ is generated, and the reference coefficient $C_2$ is the summed magnitude value when the stress corresponding to 60% of failure strength $\sigma_{f(peak)}$ is generated, and the reference coefficient $C_3$ is the summed magnitude value when the crack damage stress $\sigma_{cd}$ corresponding to 80% of failure strength $\sigma_{f(peak)}$ is generated.

The description of the case that other parametric values obtained by performing the compression test is used as the reference for evaluating the damage level in the geotechnical structures applies correspondingly to the case that the summed magnitude value is used as the reference for evaluating the damage level in the geotechnical structures.

Meanwhile, the description of the case that one of the parametric values obtained by performing the tensile or shear test applies correspondingly to the case that the summed magnitude values obtained by performing the compression test is used as the reference for evaluating the damage level in the geotechnical structures.

In the second embodiment, since a new parameter of the summed magnitude is employed and an attenuation effect due to the wave waveguide is reflected on the new parameter, it is possible to generalize the parametric values regardless of the distance between the AE sensors and the source of the AE signal.

According to the present invention, the wave waveguide is divided into the inner waveguide and the outer waveguide formed of a brittle material, and the outer waveguide is damaged regardless of the conditions and formations in the geotechnical structures when an event that damages the geotechnical structures is occurred, such that the AE sensor detects the AE signal. Thus, it is possible to precisely predict the generalized level of the damage and failure in the geotechnical structures. That is, the present invention measures the specific AE signals generated from the outer waveguide of the brittle material but not the AE signals generated from the geotechnical structures, thereby precisely predicting the damage level in the geotechnical structures generated by an event that damages the geotechnical structures.

Further, according to the present invention, the wave waveguide is divided into the inner waveguide and the inner waveguide is formed of a metallic material, and a measurement apparatus affixed with AE sensors which can reduce the attenuation of the AE signals while the AE signals passes through the wave waveguide is used, thereby obtaining a wide range of AE signals.

Further, the present invention selects the reference coefficients through the laboratory tests, and the reference coefficients are compared affixed with the parameters obtained from the measurement apparatus affixed with AE sensors installed in a borehole, thereby predicting the failure in the geotechnical structures.

In addition, new parameters like the summed magnitude, the accumulated the summed magnitude and the summed magnitude frequency are employed and an attenuation effect due to the wave waveguide is reflected on the new parameters, thereby generalizing the parametric values regardless of the distance between the AE sensors and the source of the AE signal.

In the present invention, the reference coefficients are selected by the laboratory tests and then the reference coefficients is compared affixed with the parameters obtained from the measurement apparatus affixed with AE sensors. Therefore, the present invention can be widely used for estimating the damages and defects of a structure including a tunnel, a bridge and the like besides the geotechnical structures.

While the present invention has been described affixed with respect to the specific embodiments, it will be apparent to those skilled in the art that various changes and modifications may be made affixed without departing from the spirit and scope of the invention as defined in the following claims.

What is claimed is:

1. A method of predicting failure in geotechnical structures, comprising:
    measuring specific AE signals generated from damages to an outer waveguide by a deformation or movement in the geotechnical structures using a measurement apparatus affixed with AE sensors, wherein the measurement apparatus affixed with AE sensors is fixedly installed in a borehole and passes through an expected failure plane and includes both an inner waveguide, which is formed of metallic material that is intended to prevent sharp attenuations of AE signals, and an outer waveguide; two AE sensors are attached to the inner waveguide so that the expected failure plane is interposed between two AE sensors, and one of which above the other; the outer waveguide firmly encloses at least one AE sensor as well as the inner waveguide; and the outer waveguide is formed of a homogeneous brittle material that is intended to generate specific AE signals regardless of ground conditions or formations when the outer waveguide is damaged by the events that indicated there are deformations or movements in the geotechnical structures;
    obtaining arrival times from an AE signal generated from the damages to the outer waveguide by a specific event, wherein the AE signal is measured by the upper AE sensor and the lower AE sensor and the arrival time is defined as time when an initial AE signal waveform arrives at each of the upper and lower AE sensors;
    determining a distance between the upper AE sensor and a source of the AE signal or a distance between the lower AE sensor and the source of the AE signal from a difference between the arrival times obtained from the AE signal measured by the upper AE sensor and the lower AE sensor;
    obtaining at least one parametric values of a summed magnitude value, an accumulated summed magnitude value and summed magnitude frequency value of the AE signals measured by the upper or lower AE sensor, in order to predict the failure in the geotechnical structures from the AE signals measured by the upper or lower AE sensor;
    performing at least one of laboratory tensile, shear and compression tests with respect to a laboratory testing measurement apparatus affixed with AE sensors that is the same as the installed measurement apparatus in the geotechnical structures, and obtaining AE signals generated by the damage of an outer waveguide of the laboratory testing measurement apparatus affixed with AE sensors, wherein obtaining laboratory parametric values with applied load in the laboratory tests, which correspond to the parametric values in the geotechnical structures, are extracted from AE signals generated by the damage of the outer waveguide of the laboratory testing measurement apparatus; and
    comparing one or more reference parametric values and obtained parametric values in geotechnical structures, wherein the one or more reference parametric values indicate the damage levels in geotechnical structures, are among laboratory parametric values corresponding to the parametric values in the geotechnical structures and the obtained parametric values in geotechnical sturctures are obtained in the parametric values-obtaining step in geotechnical structures, and
    wherein the summed magnitude is a parameter which is indicated by $G(d)\Theta F(E)$ of the AE signals and the AE signals are measured during a desired time interval $\Delta t_1$ and generated from the damage to an outer waveguide by the specific events,
    and the accumulated summed magnitude is a parameter, which is an accumulative sum of the summed magnitude values with respect to the different specific events according to the lapse of time, and
    the summed magnitude frequency is a parameter which is a total of the summed magnitude values obtained during a desired time interval $\Delta t_2$ with respect to the different specific events according to the lapse of time, and
    assuming that k is a natural number equal to or larger than 2, $\Delta t_2$ is $\Delta t_2 = k\Delta t_2$, and
    d is a distance between one of the upper and lower AE sensors and the source of the AE signal, which is used in obtaining the summed magnitude value in the determining of distance from specific source and
    $G(d)$ is an attenuating function according to d, and is indicated by $G(d)=A_1 d+A_2$ or $G(d)=B_1 e^{-d}+B_2$, and
    $A_1, A_2, B_1$ and $B_2$ are regression coefficients which are decided by a material of the inner guide, and
    $\Theta$ is an operator decided by $G(d)$, and
    $F(E)$ is an energy function of the AE signal used in obtaining of the summed magnitude value.

2. The method of claim 1, wherein $F(E)$ is one of $$\log\left(\frac{ppA}{2\pi f}\right), \log\left(\sqrt{\frac{\sum_{j=1}^{n} A_j^2}{n}}\right) \text{ and } dB_{peak},$$

wherein ppA is a maximum particle acceleration of the AE signal used in obtaining the summed magnitude value,
f is a dominant frequency of the AE signal used in obtaining the summed magnitude value,
n is a count of the AE signal used in obtaining the summed magnitude value,
$A_j$ is an amplitude of a j-th waveform forming the AE signal used in obtaining the summed magnitude value, which is over a threshold value, and
$dB_{peak}$ is a maximum amplitude in the waveform forming the AE signal used in obtaining the summed magnitude value.

3. The method of claims 1 or 2, wherein coefficients of reference parameters corresponding to the damage levels in the geotechnical structures are $C_1, C_2$ and $C_3$, and,
    the reference coefficient $C_1$, which is the parameter value, is a value when force corresponding to 80% of failure strength is exerted to the laboratory testing measurement apparatus affixed with AE sensors used in the laboratory test,
    the reference coefficient $C_2$, which is the parameter value, is a value when force corresponding to 60% of failure strength is exerted to the laboratory measurement apparatus affixed with AE sensors used in the laboratory test, and
    the reference coefficient $C_3$, which is the parameter value, is a value when force corresponding to 40% of failure strength is exerted to the laboratory measurement apparatus affixed with AE sensors used in the laboratory test.

* * * * *

UNITED STATES PATENT AND TRADEMARK OFFICE
CERTIFICATE OF CORRECTION

PATENT NO.       : 8,019,558 B2
APPLICATION NO.  : 12/666556
DATED            : September 13, 2011
INVENTOR(S)      : Dae-Sung Cheon Page 1 of 1

It is certified that error appears in the above-identified patent and that said Letters Patent is hereby corrected as shown below:

(1) Column 21, Line 44, Claim 1, "and summed" should read -- and a summed --

(2) Column 22, Line 52, Claim 3, "C1,which" should read -- C1, which --

(3) Column 22, Line 3, Claim 1, delete "sturctures" and insert -- structures --

Signed and Sealed this
Tenth Day of January, 2012

David J. Kappos
*Director of the United States Patent and Trademark Office*